(12) United States Patent
Jernigan, IV et al.

(10) Patent No.: US 7,617,370 B2
(45) Date of Patent: Nov. 10, 2009

(54) DATA ALLOCATION WITHIN A STORAGE SYSTEM ARCHITECTURE

(75) Inventors: Richard P. Jernigan, IV, Ambridge, PA (US); Allen Tracht, Pittsburgh, PA (US); Peter F. Corbett, Lexington, MA (US)

(73) Assignee: NetApp, Inc., Sunnyvale, CA (US)

(*) Notice: Subject to any disclaimer, the term of this patent is extended or adjusted under 35 U.S.C. 154(b) by 0 days.

(21) Appl. No.: 11/118,681

(22) Filed: Apr. 29, 2005

(65) Prior Publication Data
US 2006/0248273 A1    Nov. 2, 2006

(51) Int. Cl.
*G06F 13/00* (2006.01)
(52) U.S. Cl. ........................ 711/165; 709/219
(58) Field of Classification Search ............ 711/165; 709/219
See application file for complete search history.

(56) References Cited

U.S. PATENT DOCUMENTS

| | | | |
|---|---|---|---|
| 4,156,907 | A | 5/1979 | Rawlings et al. |
| 4,399,503 | A | 8/1983 | Hawley |
| 4,570,217 | A | 2/1986 | Allen et al. |
| 4,598,357 | A | 7/1986 | Swenson et al. |
| 4,688,221 | A | 8/1987 | Nakamura et al. |
| 4,698,808 | A | 10/1987 | Ishii |
| 4,761,785 | A | 8/1988 | Clark et al. |
| 4,805,090 | A | 2/1989 | Coogan |
| 4,837,675 | A | 6/1989 | Bean et al. |
| 4,864,497 | A | 9/1989 | Lowry et al. |
| 4,896,259 | A | 1/1990 | Jacobs et al. |
| 4,899,342 | A | 2/1990 | Potter et al. |
| 4,989,206 | A | 1/1991 | Dunphy, Jr. et al. |
| 5,124,987 | A | 6/1992 | Milligan et al. |
| RE34,100 | E | 10/1992 | Hartness |
| 5,155,835 | A | 10/1992 | Belsan |
| 5,163,131 | A | 11/1992 | Row et al. |

(Continued)

FOREIGN PATENT DOCUMENTS

EP    06 75 1768    3/2009

(Continued)

OTHER PUBLICATIONS

Cabrera et al., Swift: Using Distributed Disk Striping to provide High I/O Data Rates, Fall 1991, Computing Systems vol. 4 No. 4.*

(Continued)

*Primary Examiner*—Christian P Chace
*Assistant Examiner*—Jared I Rutz
(74) *Attorney, Agent, or Firm*—Cesari and McKenna, LLP

(57) ABSTRACT

Provided is a method and system for data allocation within a storage system architecture. One or more nodes of the storage system architecture provides access to striped data stored on a striped volume set. Each node can store a volume of the striped volume set. Further, the striped volume set is identified by a striping table. When modifying the storage system architecture, such as adding a volume to, or removing a volume from, the striped volume set, the striping table is rearranged to accurately identify the location of striped data on the striped volume set. At least one restriping process implemented on the striping table affects the volume utilization efficiency, hot-spotting behavior, and distribution efficiency of the striped volume set.

26 Claims, 22 Drawing Sheets

U.S. PATENT DOCUMENTS

| | | | |
|---|---|---|---|
| 5,202,979 | A | 4/1993 | Hillis et al. |
| 5,278,979 | A | 1/1994 | Foster et al. |
| 5,403,667 | A | 4/1995 | Simoens |
| 5,426,747 | A | 6/1995 | Weinreb et al. |
| 5,568,629 | A | 10/1996 | Gentry et al. |
| 5,581,724 | A | 12/1996 | Belsan et al. |
| 5,819,292 | A | 10/1998 | Hitz et al. |
| 5,996,089 | A | 11/1999 | Mann et al. |
| 6,058,489 | A * | 5/2000 | Schultz et al. ................. 714/7 |
| 6,061,770 | A | 5/2000 | Franklin |
| 6,081,875 | A | 6/2000 | Clifton et al. |
| 6,304,942 | B1 * | 10/2001 | DeKoning ................. 711/114 |
| 6,341,341 | B1 | 1/2002 | Grummon et al. |
| 6,516,380 | B2 | 2/2003 | Kenchammana-Hoskote et al. |
| 6,636,879 | B1 | 10/2003 | Doucette et al. |
| 6,643,654 | B1 | 11/2003 | Patel et al. |
| 6,671,773 | B2 | 12/2003 | Kazar et al. |
| 6,895,485 | B1 * | 5/2005 | DeKoning et al. .......... 711/170 |
| 7,127,577 | B2 | 10/2006 | Koning et al. |
| 7,194,597 | B2 | 3/2007 | Willis et al. |
| 7,409,494 | B2 | 8/2008 | Edwards et al. |
| 2003/0236944 | A1 * | 12/2003 | Thompson et al. .......... 711/114 |
| 2004/0030668 | A1 | 2/2004 | Pawlowski et al. |
| 2004/0139167 | A1 | 7/2004 | Edsall et al. |
| 2005/0091451 | A1 * | 4/2005 | Frolund et al. .............. 711/114 |
| 2005/0192932 | A1 | 9/2005 | Kazar et al. |
| 2006/0248379 | A1 | 11/2006 | Jernigan |
| 2007/0088702 | A1 | 4/2007 | Fridella et al. |

FOREIGN PATENT DOCUMENTS

| | | |
|---|---|---|
| JP | 10003440 A | 6/1998 |
| WO | WO 89/10594 | 11/1989 |
| WO | WO 00/07101 A1 | 2/2000 |
| WO | WO 03/09124 | 1/2003 |

OTHER PUBLICATIONS

Massiglia, Paul, The RAIDbook, Aug. 8, 1994, the RAID Advisory Board, Fourth Edition, pp. 35-37.*

Hartman, John H. and Ousterhout, John K., the Zebra striped network file system, ACM Transactions on Computer Systems, Aug. 1995, ACM, vol. 13 Issue 3, pp. 274-310.*

John Henry Hartman, The Zebra Striped Network File System, 1994, retreived from internet Jul. 11, 2008 <url: http://www.cs.arizona.edu/~jhh/papers/thesis.pdf> published online Jun. 5, 2001.*

Charles M. Kozierok, Stripe Width and Stripe Size, 2005, retreived from internet Jan. 2, 2009 [url:http://www.storagereview.com/guide2000/ref/hdd/perf/raid/concepts/perfStripe.html], pp. 1-4.*

Administration Guide found at http://www.openafs.org/pages/doc/AdminGuide/auagd010.htm, visited on Mar. 2, 2005.

Basilico, et al., *Error Correction System Using "Shadow Memory,"* IBM Technical Disclosure Bulletin, May 1984, pp. 5792-5793.

Bitton, Dina, *Disk Shadowing*, Proceedings of the 14th VLDB Conference, LA, CA (1988).

Blasgen, M.W. et al., *System R:An architectural Overview*,Reprinted from IBM Systems Journal vol. 20, No. 1, 1981© 1981, 1999.

Borenstein, Nathaniel S., *CMU's Andrew project a retrospective*, Communications of ACM, (39)12, Dec. 1996.

Brown, Mark R. et al., *The Alpine file system*, ACM Transactions on Computing Systems, 3(4):261—293, Nov. 1985.

Chen, Peter M., et al., *An Evaluation of Redundant Arrays of Disks Using an Amdahl 5890* Performance Evaluation, pp. 74-85, 1990.

Chutani, Sailesh, et al., *The Episode file system*, In Proceedings of the USENIX Winter 1992.

Clark, B.E., et al., *Application System /400 Performance Characteristics*, IBM Systems Journal, 28(3): 407-423, 1989.

Data Sheet for the Check Point Software Technologies product Flood-Gate-1 (1997).

Dibble, Peter C., et al., Beyond Striping: The Bridge Multiprocessor File System, Computer Science Department, University of Rochester, Aug. 11, 1989.

Douglis, Fred, et al., *A comparison of two distributed systems: Amoeba and Sprite*—Computing Systems, 4(4), Fall 1991, pp. 353-385 ?{copy of article I have has no date or cite}.

Gait, Jason, *Phoenix: A Safe In-Memory File System*. Communications of the ACM, 33(1):81—86, Jan. 1990.

Hartman, John H. et al., *Performance Measurements of a Multiprocessor Sprite Kernel*, Proceedings of the USENIX Conference, 1990.

Hitz, Dave et al., *File System Design for an NFS File Server Appliance*, Technical Report 3002, Rev. C395, presented Jan. 19, 1994.

Howard, John H, et al. *Scale and Performance in a Distributed File System*, Carnegie Mellon University, CMU-ITC-87-068, Aug. 5, 1987.

Howard, John, H. et al., *Scale and performance in a distributed file system*, ACM Trans. Computer. System., 6(1), Feb. 1988, pp. 51-81.

Howard, John H., *An Overview of the Andrew File System*, Carnegie Mellon University, CMU-ITC-88-062.

*The IBM Svstem/38*, Chapter 8, pp. 137-15.

Isomaki, Markus, *Differentiated Service for the Internet*, Department of Technical Physics and Mathematics, May 9, 1998.

Kazar, Michael L., et al., *Decorum File System Architectural Overview*, USENIX Summer Conference, Anaheim, California, 1990.

Lomet, David., et al., *The performance of a multiversion access method*, ACM SIGMOD International Conference on Management of Data, 19:353-363.

Lorie, Raymond, A, *Physical integrity in a large segmented database*, ACM Trans. Database Systems, (2)1: 91-104, Mar. 1977.

Lorie, RA, *Shadow Page Mechanism*, IBM Technical Disclosure Bulletin, Jun. 1986, pp. 340-342.

McKusick, Marshall Kirk, et al., *A Fast File System for UNIX*, Computer Science Division, Department of Electrical Engineering and Computer Sciences, Univ. of CA, Berkley, Feb. 18, 1994.

Miller, Ethan L., et al., *RAMA:A File System for Massively Parallel Computers*, 12th IEEE Symposium on Mass Storage Systems, Monterey CA, Apr. 1993, pp. 163-168.

Moons, Herman et al., *Location-Independent Object Invocation in Open Distributed Systems*, Autumn 1991 EurOpen Technical Conference and Exhibition, pp. 287-300 (Sep. 16-20, 1991).

Morris, James H., et al, *Andrew: A Distributed Personal Computing Environment*, Comm. of the ACM, vol. 29, Mar. 1986, pp. 184-201.

Mullender, Sape J., et al., *A distributed file service based on optimistic concurrency control*, ACM Symposium on Operating System Principles (Orcas Island, Washington). Published as Operating Systems Review, 19(5):51-62, Dec. 1985.

Muller, Keith, et 'al., *A High Performance Multi-Structured File System Design*, In Proceedings of the 13th ACM Symposium on Operating Systems Principles, Oct. 1991, pp. 56-67.

Moons, Herman et al., *Location-Independent Object Invocation in Open Distributed Systems*, Autumn 1991 EurOpen Technical Conference and Exhibition, pp. 287-300 (Sep. 16-20, 1991).

Morris, James H., et al, *Andrew: A Distributed Personal Computing Environment*, Comm. of the ACM, vol. 29, Mar. 1986, pp. 184-201.

Mullender, Sape J., et al., *A distributed file service based on optimistic concurrency control*, ACM Symposium on Operating System Principles (Orcas Island, Washington). Published as Operating Systems Review, 19(5):51-62, Dec. 1985.

Muller, Keith, et al., *A High Performance Multi-Structured File System Design*, in Proceedings of the 13th ACM Symposium on Operating Systems Principles, Oct. 1991, pp. 56-67.

Ousterhout, John K. et al., *The Sprite Network Operating System*, Computer Science Division, Department of Electrical Engineering and Computer Sciences, Univ. of CA, Berkley, Nov. 19, 1987.

Ousterhout, John et al., *Beating the I/O Bottleneck: A Case for Log-Structured File Systems*, Technical Report, Computer Science Division, Electrical Engineering and Computer Sciences, University of California at Berkeley, Oct. 30, 1988.

Ousterhout, John, *Why Aren't Operating Systems Getting Faster as Fast as Hardware?*, Digital WRL Technical Note TN-11, Oct. 1989.

Ousterhout, John, *A Brief Retrospective On The Sprite Network Operating System*, found at http://www.cs.berkeley.edu/projects/sprite/retrospective.html.visited on Mar. 11, 2005.

Patterson, D., et al., *A Case for Redundant Arrays of Inexpensive Disks (RAID)*, Technical Report, CSD-87-391, Computer Science Division, Electrical Engineering and Computer Sciences, University of California at Berkeley (1987).

Patterson, D., et al., *A Case for Redundant Arrays of Inexpensive Disks (RAID)*, SIGMOD International Conference on Management of Data, Chicago, IL, USA, Jun. 1-3, 1988, SIGMOD Record (17)3:109-16 (Sep. 1988).

Peterson, Zachary Nathaniel Joseph, *Data Placement for Copy-on-Write Using Virtual Contiguity*, University of CA, Santa Cruz, Master of Science in Computer Science Thesis, Sep. 2002.

Quinlan, Sean, *A Cached WORM File System*, Software-Practice and Experience, 21(12):1289-1299 (1991).

Redundant Array of Independent Disks, from Wikipedia, the free encyclopedia, found at http://en.wikipedia.org/wiki/RAID, visited on Mar. 9, 2005.

Rosenberg, J., et al., *Stability in a Persistent Store Based on a Large Virtual Memory*, In Security and Persistence, Rosenber, J. & Keedy, J.L. (ed), Springer-Verlag (1990) pp. 229-245.

Rosenblum, Mendel, et al., *The LFS Storage Manager*, Computer Science Division, Electrical Engin. And Computer Sciences, Univ. of CA, presented at Summer '90 USENIX Technical Conference, Anaheim, CA Jun. 1990.

Rosenblum, Mendel, et al, The *Design and Implementation of a Log-Structured File System* Jul. 24, 1991 pp.1-15.

Rosenblum, Mendel, et al, *The Design and Implementation of a Log-Structured File System*, , In Proceedings of ACM Transactions on Computer Systems, (10)1:26-52, Feb. 1992.

Sandberg, Russel et al., *Design and implementation of the Sun Network Filesystem*. In Proc. Summer 1985 USENIX Conf., pp. 119-130, Portland OR (USA), Jun. 1985.

Santry, Douglas S., et al., *Deciding When to Forget in the Elephant File System*, Operating Systems Review, 34(5), (Dec. 1999) pp. 110-123.

Satyanarayanan, M., et al., *The ITC Distributed File System: Principles and Design*, In Proceedings of the 10th ACM Symposium on Operating Systems Principles, (19)5:56-67, Dec. 1985.

Satyanarayanan,.M.. *A survey of distributed file-systems.* Annual Review of Computing Science, 4(73-104), 1989.

Satyanarayanan, M., et al, *Coda: a highly available file system for a distributed workstation environment* Carnegie Mellon University, CMU-ITC.

Satyanarayanan, M., et al, *Coda: a highly available file system for a distributed workstation environment* IEEE Transactions on Computers, 39(4):447-459, 1990.

Satyanarayanan, Mahadev, *Scalable, Secure, and Highly Available Distributed File Access*, Computer May 1990: 9-21.

Sidebotham, Bob, *Volumes: The Andrew File System Data Structuring Primitive*, EEUG Conference Proceedings, Manchester, UK, Autumn 1986.

User Guide found at http://www.openafs.org/pages/doc/UserGuide/auusg004.htm, visited on Mar. 2, 2005.

Welch, Brent B., et al., *Pseudo Devices: User-Level Extensions to the Sprite File System*, Computer Science Division, Department of Electrical Engineering and Computer Sciences, Univ. of CA, Berkley, Apr. 1988.

Welch, Brent B., et al., *Pseudo-File-Systems*, Computer Science Division, Department of Electrical Engineering and Computer Sciences, Univ. of CA, Berkley, Oct. 1989.

Wittle, Mark, et al, *LADDIS: The next generation in NFS file server benchmarking*, USENIX Association Conference Proceedings, Apr. 1993.

"Notification of Transmittal of The International Search Report and the Written Opinion of the International Searching Authority, or the Declaration" for International Applicaiton No. PCT/US06/16243 with an international filing date of Apr. 27, 2006.

Notification of Transmittal of the International Search Report and the Written Opinion of the International Searching Authority, or the Declaration. PCT/US2006/016055. Apr. 27, 2006.

Efficient, Distributed Data Placement Strategies for Storage Area Networks, Andrew Brinkmann, et al. XP-002404501, 2000.

Disk Subsystem Load Balancing: Disk Striping vs. Conventional Data Placement, Gregory R. Ganger, et al. Department of Electrical Engineering and Computer Science, University of Michigan, Ann Arbor. Jan. 5, 1993.

A Fast Algorith for Online Placement and Reorganization of Replicated Data, R.J. Honicky, et al. Storage Systems Research Center, University of California, Santa Cruz. Apr. 22, 2003.

A Row Permutated Data Reorganization Algorithm for Growing Server-Less Video-on-Demand Systems, T.K. Ho, et al. Department of Information Engineering, the Chinese University of Hong Kong, Shatin, N.T., Hong Kong. May 12, 2003.

Akyurek, Sedat, Placing Replicated Data to Reduce Seek Delays, Department of Computer Science, University of Maryland, UMIACS-TR-91-121, CS-TR-2746, Aug. 1991.

Chaudhuri, Surajit, et al., Self-Tuning Technology in Microsoft SQL Server, Data Engineering Journal 22, Feb. 1999 pp. 20-27.

Coyne, Robert A., et al., Storage Systems for National Information Assets, Proc. Supercomputing 92, Minneapolis, Nov. 1992, pp. 626-633.

Finlayson, Ross S., et al., Log Files: An Extended File Service Exploiting Write-Once Storage Department of Computer Science, Stanford University, Report No. STAN-CS-87-1177, Sep. 1987.

Gray, Jim, et al., the Recovery Manager of the System R Database Manager, ACM Computing Surveys, (13)2:223-242 1981.

Hecht, Matthew S., et al. Shadowed Management of Free Disk Pages with a Linked List, ACM Transactions on Database Systems, 8/4, Dec. 1983, pp. 503-514.

Kazar, Michael Leon, Synchronization and Caching Issues in the Andrew File System, Carnegie Mellon University, CMU-ITC-88-063.

Kemper, Alfons, et al., Performance Tuning for SAP R/3, Data Engineering Journal 22, Feb. 1999 pp. 33-40.

Kent, Jack et al., Optimizing Shadow Recovery Algorithms, IEEE Transactions on Software Engineering, 14 (2): 155-168, Feb. 1988.

Kistler, et al., Disconnected Operation in the Coda File System, ACM Transactions on Computer Systems, vol. 10, No. 1, Feb. 1992, pp. 3-25.

Schiefer, Berni, et al., DB2 Universal Database Performance Tuning, Data Engineering Journal 22, Feb. 1999 pp. 12-19.

Seltzer, Margo I., et al., Journaling Versus Soft Updates: Asynchronous Meta-Data Protection in File Systems, Proceedings of 200 USENIX Annual Technical Conference, Jun. 18-23, 2000.

Shasha, Dennis, Tuning Time Series Queries in Finance: Case Studies and Recommendations, Data Engineering Journal 22, Feb. 1999 pp. 41-47.

Subramanian, Muralidhar, et al., Performance Challenges in Object-Relational DBMSs, Data Engineering Journal 22, Feb. 1999 pp. 28-32.

Weikum, Gerhard, et al., Towards Self-Tuning Memory Management for Data Servers, Data Engineering Journal 22, Feb. 1999 pp. 3-11.

West, Michael, et al. The ITC Distributed File System: Prototype and Experience, Carnegie-Mellon University, Technical Report CMU-ITC-040, Mar. 1985.

Zayas, Edward R., AFS-3 Programmer's Reference: Architectural Overview, Transarc Corporation, Pittsburgh, PA, 1.0 edition 1991.

Buddhikot, M., et al., "Design of a Large Scale Multimedia Storage Server", Computer Networks and ISDN Systems 27, Dec. 1994, pp. 503-517.

\* cited by examiner

DATA ALLOCATION WITHIN A STORAGE SYSTEM ARCHITECTURE

CROSS REFERENCE TO RELATED APPLICATIONS

This application is related to U.S. patent application Ser. No. 11/119,278 entitled "Storage System Architecture for Striping Data Container Content Across Volumes of a Cluster," filed on Apr. 29, 2005 and U.S. patent application Ser. No. 11/119,118 entitled "System and Method for Restriping Data Across a Plurality of Volumes," filed on Apr. 29, 2005, which are hereby incorporated by reference in their entirety.

TECHNICAL FIELD

Embodiments of the present invention relate to storage systems, and in particular, to allocating data across a plurality of volumes of a storage system cluster.

BACKGROUND

Typically, a storage system provides access to information that is stored on one or more storage devices connected to the storage system. Access to the information is possible by organizing the storage devices into volumes, which logically organize the information stored on the storage devices. The storage devices are typically disk drives organized as a disk array, such that the term "disk" describes a self-contained rotating magnetic media storage device. Further, the term disk in this context is synonymous with a hard disk drive (HDD) or direct access storage device (DASD).

The storage system may be further configured to operate according to a client/server model of information delivery to thereby allow many clients to access data containers stored on the system. In this model, the client may comprise an application, such as a database application, executing on a computer that "connects" to the storage system over a computer network, such as a point-to-point link, shared local area network (LAN), wide area network (WAN), or virtual private network (VPN) implemented over a public network such as the Internet. Each client may request the services of the storage system by issuing file-based and block-based protocol messages (in the form of packets) to the system over the network.

A plurality of storage systems may be interconnected to provide a storage system environment configured to service many clients. Each storage system may be configured to service one or more volumes, wherein each volume stores one or more data containers. Yet, often a large number of data access requests issued by the clients may be directed to a small number of data containers serviced by a particular storage system of the environment. A solution to such a problem is to distribute the volumes serviced by the particular storage system among all of the storage systems of the environment. This, in turn, distributes the data access requests, along with the processing resources needed to service such requests, among all of the storage systems, thereby reducing the individual processing load on each storage system. However, a noted disadvantage arises when only a single data container, such as a file, is heavily accessed by clients of the storage system environment. As a result, the storage system attempting to service the requests directed to that data container may exceed its processing resources and become overburdened, with a concomitant degradation of speed and performance.

SUMMARY

Embodiments of the present invention provide a method and a system for data allocation within a storage system architecture. Specifically, the present invention overcomes the disadvantages of the prior art by providing a storage system architecture comprising one or more volumes distributed across a plurality of nodes interconnected as a cluster. The volumes are organized as a striped volume set (SVS) and configured to store content of data containers, such as files and logical units, served by the cluster in response to multi-protocol data access requests issued by clients. Each node of the cluster includes (i) a storage server adapted to service a volume of the SVS and (ii) a multi-protocol engine adapted to redirect the data access requests to any storage server of the cluster. Notably, the content of each data container is apportioned among the volumes of the SVS to thereby improve the efficiency of storage service provided by the cluster. It should be appreciated that the present invention can be implemented in numerous ways, such as a process, an apparatus, a system, a device or a method on a computer readable medium. Several inventive embodiments of the present invention are described below.

In an exemplary embodiment of a method of data allocation, the method includes identifying a storage system architecture for allocating data among a plurality of storage systems. The method further includes determining an allocation structure, such that the allocation structure describes the distribution of chunks of data. The method also includes updating the allocation structure when modifying the storage system architecture.

In yet another exemplary embodiment of a system for data allocation within a storage system architecture, the system includes an allocation structure that identifies multiple volumes for distributing chunks of data. Each of the multiple volumes is organized by at least one storage system of the storage system architecture. Further, the embodiment of the system includes multiple restriping processes, such that each of the multiple restriping processes rearranges contents of the allocation structure in response to the modification of the storage system architecture.

In an embodiment of a computer readable medium that includes instructions for data allocation within a storage system architecture, the embodiment includes instructions for allocating data among multiple storage systems of the storage system architecture. The embodiment also includes instructions for determining an allocation structure, such that the allocation structure describes the distribution of chunks of data. Further, the embodiment includes instructions for updating the allocation structure when modifying the storage system architecture.

In an embodiment of a computing environment for allocating data, the embodiment includes means for identifying multiple volumes for distributing chunks of data. Each of the multiple volumes is organized by at least one system of the computing environment. Further, the embodiment includes means for rearranging contents of an allocation structure in response to the modification of the computing environment.

Other aspects of the invention will become apparent from the following detailed description taken in conjunction with

DETAILED DESCRIPTION

The following embodiments describe a method and a system for data allocation within a storage system architecture. Specifically, the present invention overcomes the disadvantages of the prior art by providing a storage system architecture comprising one or more volumes distributed across a plurality of nodes interconnected as a clustered computing environment. The volumes are organized as a striped volume set (SVS) and configured to store content of data containers, such as files and logical units, served by the cluster in response to multi-protocol data access requests issued by clients. Each node of the cluster includes (i) a storage server adapted to service a volume of the SVS and (ii) a multi-protocol engine adapted to redirect the data access requests to any storage server of the cluster. Notably, the content of each data container is apportioned among the volumes of the SVS to thereby improve the efficiency of storage service provided by the cluster. It will be obvious, however, to one skilled in the art, that embodiments of the present invention may be practiced without some or all of these specific details. In other instances, well known process operations have not been described in detail to prevent obscuring the embodiments of the present invention described herein.

Figure 1:
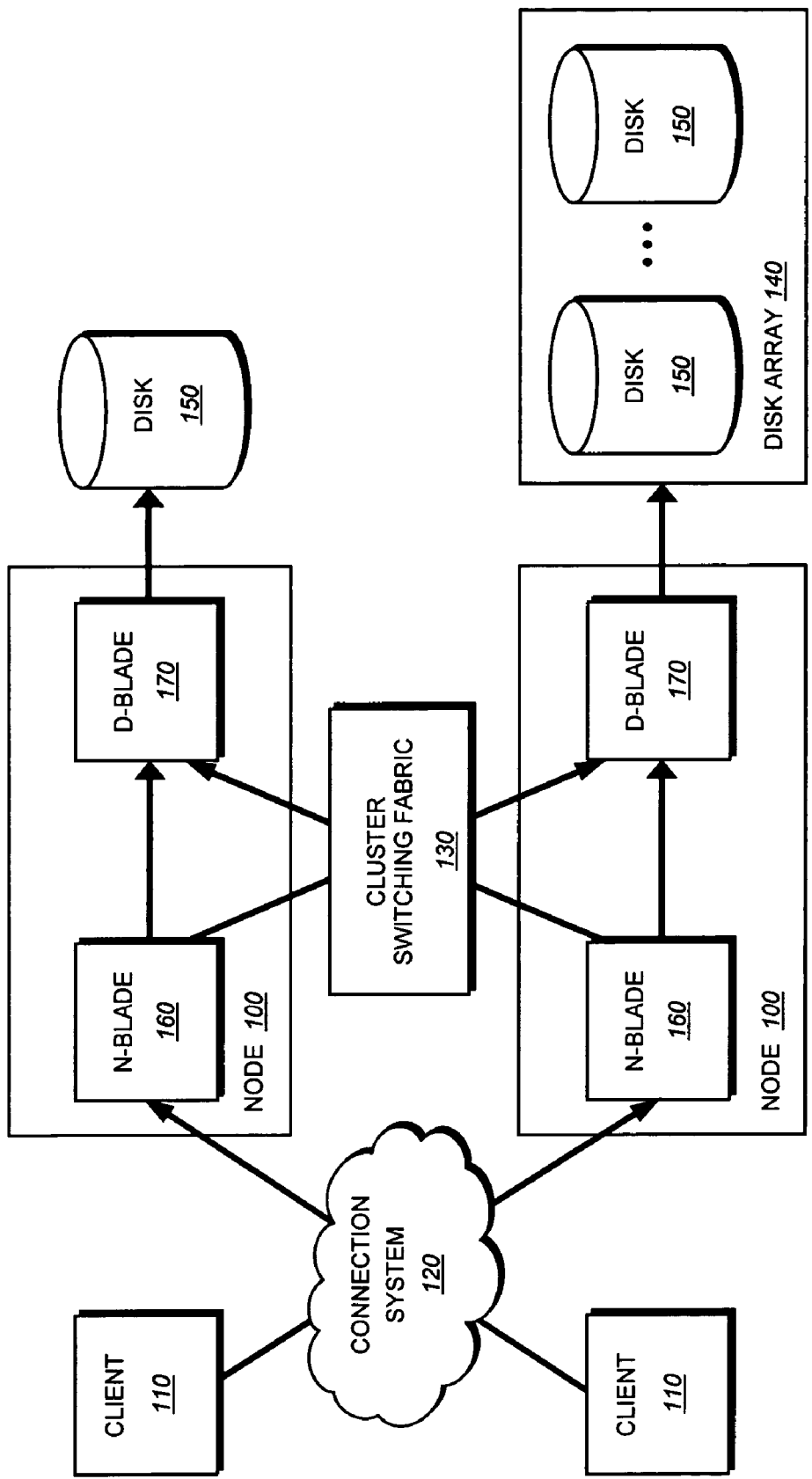
FIG. 1 is a diagram illustrating a plurality of nodes interconnected as a cluster of a clustered computing environment, in accordance with an embodiment of the invention.

The computing environment illustrated in the diagram of FIG. 1 comprises a plurality of nodes 100 interconnected as a cluster of a clustered computing environment, in accordance with an embodiment of the invention. The nodes 100 are configured to provide storage services relating to the organization of information on storage devices, such as the disk array 140. The nodes 100 comprise various functional components that cooperate to provide a distributed storage system architecture of the cluster. Further, each node 100 is organized as a network element (N-blade 160) and a disk element (D-blade 170). The N-blade 160 includes functionality that enables the node 100 to connect to clients 110 over a connection system 120, while each D-blade 170 connects to one or more storage devices, such as disks 150 of a disk array 140. The nodes 100 are interconnected by a cluster switching fabric 130 which, in the illustrative embodiment, may be embodied as a Gigabit Ethernet switch. An exemplary distributed file system architecture is generally described in U.S. Patent Application Publication No. US 2002/0116593 titled METHOD AND SYSTEM FOR RESPONDING TO FILE SYSTEM REQUESTS, by M. Kazar et al. published Aug. 22, 2002. It should be noted that while there is shown an equal number of N and D-blades in the illustrative cluster FIG. 1, there may be differing numbers of N andlor D-blades in accordance with various embodiments of the present invention. For example, there may be a plurality of N-blades and/or D-blades interconnected in a cluster configuration that does not reflect a one-to-one correspondence between the N and D-blades. As such, the description of a node 100 comprising one N-blade and one D-blade should be taken as illustrative only.

The clients 110 may be general-purpose computers configured to interact with the node 100 in accordance with a client/server model of information delivery. That is, each client 110 may request the services of the node 100, and the node 100 may return the results of the services requested by the client 110, by exchanging packets over the connection system 120. The client 110 may issue packets including file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

Figure 2:
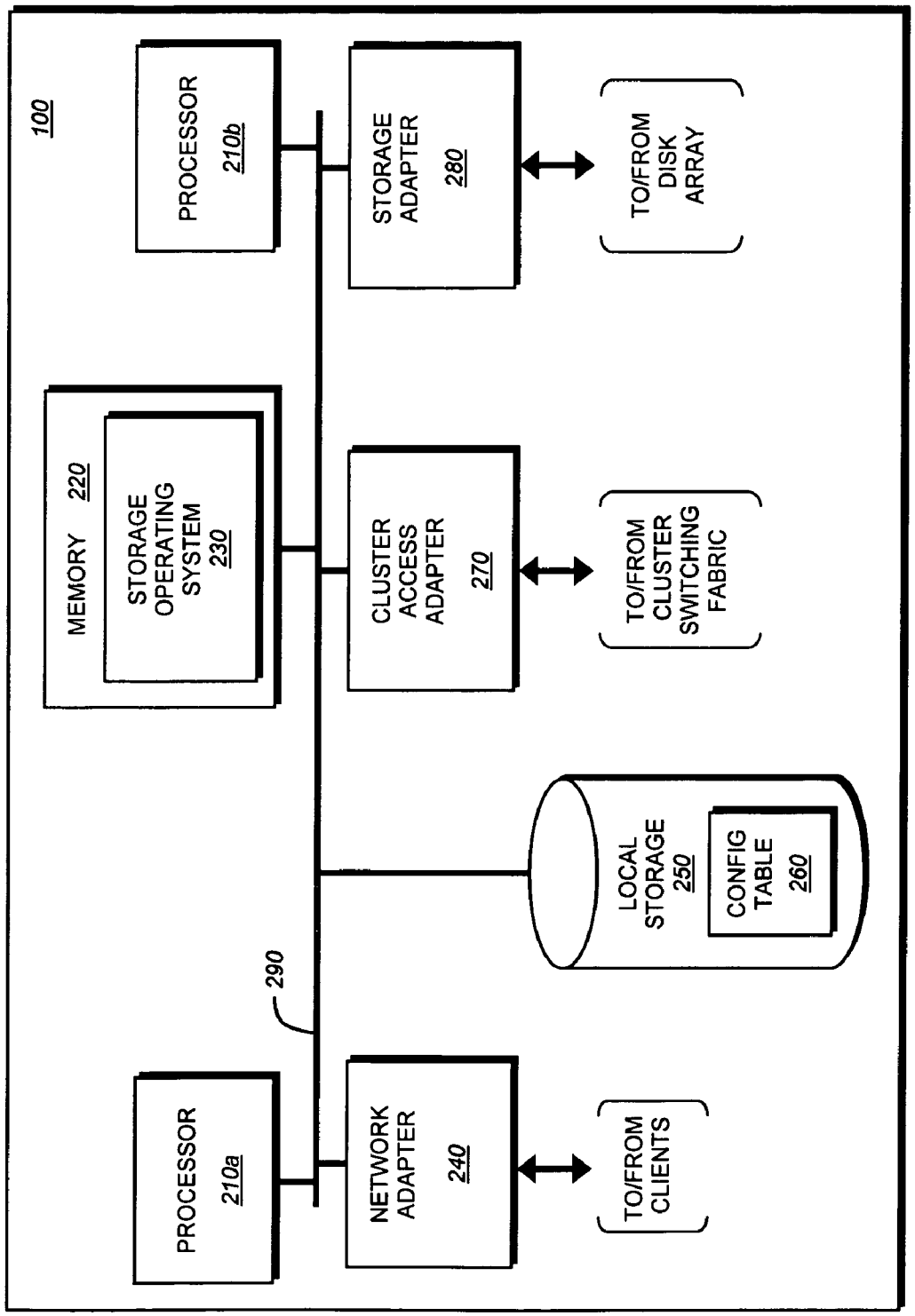
FIG. 2 is a diagram illustrating a node, in accordance with an embodiment of the invention.

FIG. 2 is a diagram illustrating the node 100, in accordance with an embodiment of the invention. In an exemplary embodiment, the node 100 is a storage system comprising a plurality of processors 210*a*, 210*b*, a memory 220, a network adapter 240, a cluster access adapter 270, a storage adapter 280 and local storage 250 interconnected by a system bus 290. The local storage 250 comprises one or more storage devices, such as disks, utilized by the node 100 to locally store configuration information (e.g., in configuration table 260) provided by one or more management processes that execute as user mode applications 900 (see FIG. 9). The cluster access adapter 270 comprises a plurality of ports adapted to couple the node 100 to other nodes 100 of the cluster. In the exemplary embodiment, Ethernet is used as the clustering protocol and interconnect media, although it will be apparent to those skilled in the art that other types of protocols and interconnects may be utilized within the cluster architecture described herein. In alternate embodiments where the N-blades and D-blades are implemented on separate storage systems or computers, the cluster access adapter 270 is utilized by the N/D-blade for communicating with other N/D-blades of the cluster.

Each node 100 may be embodied as a dual processor storage system executing a storage operating system 230 that preferably implements a high-level module, such as a file system, to logically organize the information as a hierarchical structure of named directories, files and special types of files called virtual disks (hereinafter generally "blocks") on the disks. However, it will be apparent to those of ordinary skill in the art that the node 100 may alternatively comprise a single or more than two processor system. Illustratively, one processor 210*a* executes the functions of the N-blade 160 on the node 100, while the other processor 210*b* executes the functions of the D-blade 170.

The memory 220 illustratively comprises storage locations that are addressable by the processors and adapters for storing software program code and data structures associated with the present invention. The processor and adapters may, in turn, comprise processing elements and/or logic circuitry configured to execute the software code and manipulate the data structures. The storage operating system 230, portions of which is typically resident in memory and executed by the processing elements, functionally organizes the node 100 by, inter alia, invoking storage operations in support of the storage service implemented by the node 100. It will be apparent to those skilled in the art that other processing and memory means, including various computer readable media, may be used for storing and executing program instructions pertaining to the invention described herein.

The network adapter 240 comprises a plurality of ports adapted to couple the node 100 to one or more clients 110 over point-to-point links, wide area networks, virtual private networks implemented over a public network (Internet) or a shared local area network. The network adapter 240 thus may comprise the mechanical, electrical and signaling circuitry needed to connect the node 100 to the network of the connection system 120. Illustratively, the connection system 120 may be embodied as an Ethernet network or a Fibre Channel (FC) network. Each client 110 may communicate with the node 100 over the connection system 120 by exchanging discrete frames or packets of data according to pre-defined protocols, such as TCP/IP.

The storage adapter 280 cooperates with the storage operating system 230 executing on the node 100 to access information requested by the clients 110. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 150 of the disk array 140. The storage adapter 280 comprises a plurality of ports having input/output (I/O) interface circuitry that couples to the disks 150 over an I/O interconnect arrangement, such as a conventional high-performance, Fibre Channel (FC) link topology.

Storage of information on each disk array 140 is preferably implemented as one or more storage "volumes" that comprise a collection of physical storage disks 150 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein. It should also be appreciated that such data "stripes" are different from the allocated data that are distributed as chunks of data among the plurality of storage systems, with respect to the exemplary embodiments of the present invention. "Striped data" of the exemplary embodiments will be further described in reference to FIG. 13A.

The storage operating system 230 facilitates access to the disks 150. Specifically, the storage operating system 230 implements a write-anywhere file system that cooperates with one or more virtualization modules to "virtualize" the storage space provided by disks 150. The file system logically organizes the information as a hierarchical structure of named directories and files on the disks 150. Each "on-disk" file may be implemented as set of disk blocks configured to store information, such as data, whereas the directory may be implemented as a specially formatted file in which names and links to other files and directories are stored. The virtualization module(s) allow the file system to further logically organize information as a hierarchical structure of blocks on the disks that are exported as named logical unit numbers (luns).

In the illustrative embodiment, the storage operating system 230 is preferably the NetApp® Data ONTAP™ operating system available from Network Appliance, Inc. of Sunnyvale, Calif. that implements a Write Anywhere File Layout (WAFL™) file system. However, it is expressly contemplated that any appropriate storage operating system may be enhanced for use in accordance with the inventive principles described herein. As such, where the term "WAFL" is employed, it should be taken broadly to refer to any storage operating system that is otherwise adaptable to the teachings of this invention.

Figure 3:
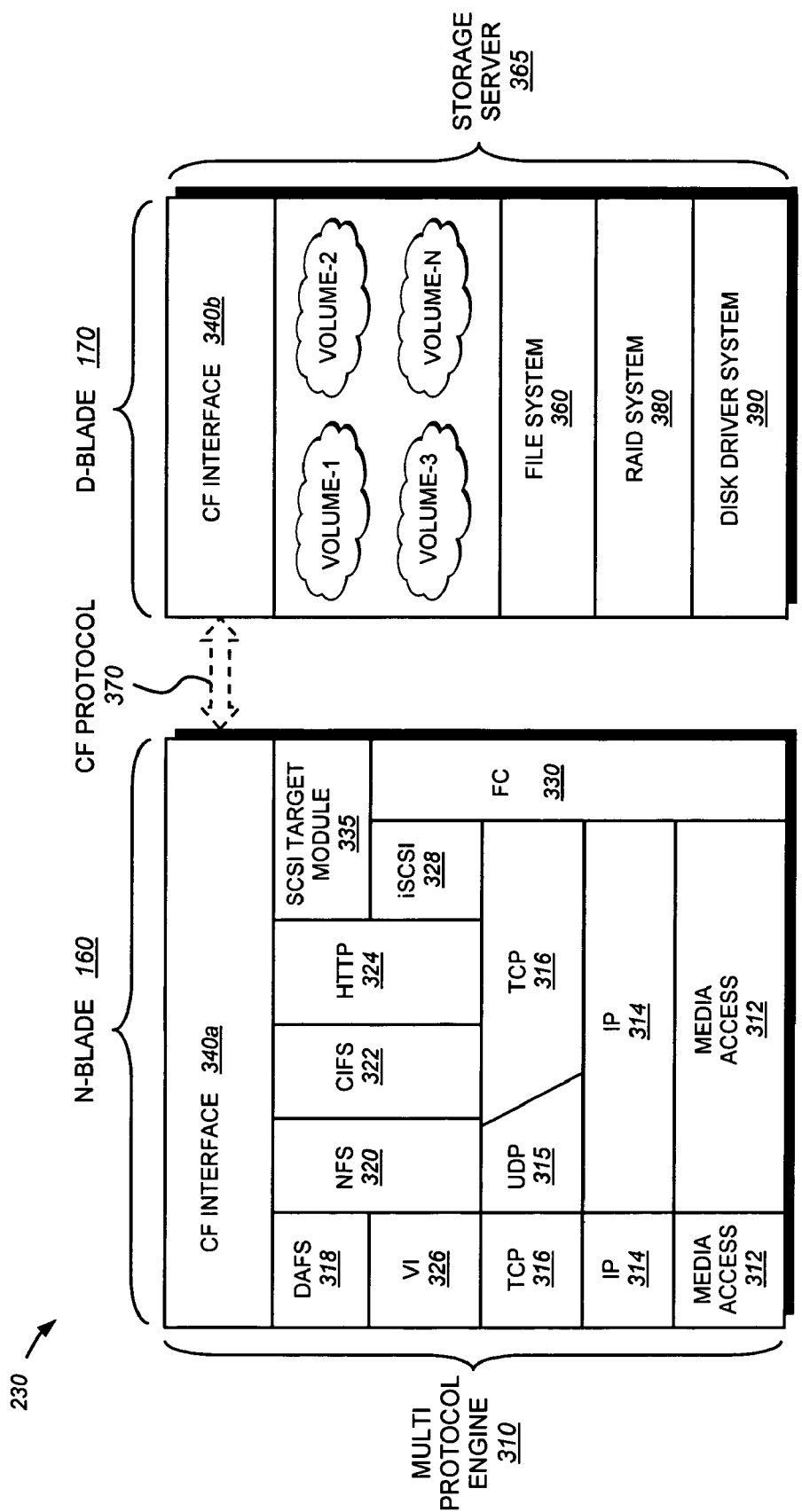
FIG. 3 is a diagram illustrating a storage operating system that may be used with an embodiment of the invention.

FIG. 3 is a diagram illustrating an exemplary storage operating system 230 that may be used with an embodiment of the invention. The storage operating system 230 comprises a series of software layers organized to form an integrated network protocol stack or, more generally, a multi-protocol engine 310 that provides data paths for clients to access information stored on the node using block and file access protocols. The multi-protocol engine includes a media access layer 312 of network drivers (e.g., gigabit Ethernet drivers) that interfaces to network protocol layers, such as the IP layer 314 and its supporting transport mechanisms, the TCP layer 316 and the User Datagram Protocol (UDP) layer 315. A file system protocol layer provides multi-protocol file access and, to that end, includes support for the Direct Access File System (DAFS) protocol 318, the NFS protocol 320, the CIFS protocol 322 and the Hypertext Transfer Protocol (HTTP) protocol 324. A VI layer 326 implements the VI architecture to provide direct access transport (DAT) capabilities, such as RDMA, as required by the DAFS protocol 318. An iSCSI driver layer 328 provides block protocol access over the TCP/IP network protocol layers, while a FC driver layer 330 receives and transmits block access requests and responses to and from the node. The FC and iSCSI drivers provide FC-specific and iSCSI-specific access control to the blocks and, thus, manage exports of luns to either iSCSI or FCP or, alternatively, to both iSCSI and FCP when accessing the blocks on the node 100.

In addition, the storage operating system 230 includes a series of software layers organized to form a storage server 365 that provides data paths for accessing information stored on the disks 150 of the node 100. To that end, the storage server 365 includes a file system module 360 that organizes any number of volumes, such as volume-1, volume-2, volume-3, and volume-N, a RAID system module 380 and a disk driver system module 390. A volume striping module (VSM; not shown) of the file system 360 implements a striped volume set (SVS), later described in reference to FIG. 10. The VSM cooperates with the file system 360 to enable the storage server 365 to service a volume of the SVS. In particular, the VSM computes the location of data container content in the SVS volume to thereby ensure consistency of such content served by the cluster. The RAID system 380 manages the storage and retrieval of information to and from the volumes/disks in accordance with I/O operations, while the disk driver system 390 implements a disk access protocol such as, e.g., the SCSI protocol.

The file system 360 implements a virtualization system of the storage operating system 230 through the interaction with one or more virtualization modules illustratively embodied as, e.g., a virtual disk (vdisk) module (not shown) and a SCSI target module 335. The vdisk module enables access by administrative interfaces, such as a user interface of a management framework 910 (see FIG. 9), in response to a user (system administrator) issuing commands to the node 100. The SCSI target module 335 is generally disposed between the iSCSI and FC drivers 328, 330, respectively, and the file system 360 to provide a translation layer of the virtualization system between the block (lun) space and the file system space, where luns are represented as blocks.

The file system 360 is illustratively a message-based system that provides logical volume management capabilities for use in access to the information stored on the storage devices, such as the disks 150. That is, in addition to providing file system semantics, the file system 360 provides functions normally associated with a volume manager. These functions include (i) aggregation of the disks, (ii) aggregation of storage bandwidth of the disks, and (iii) reliability guarantees, such as mirroring and/or parity (RAID). The file system 360 illustratively implements the WAFL file system (hereinafter generally the "write-anywhere file system") having an on-disk format representation that is block-based using, e.g., 4 kilobyte (kB) blocks and using index nodes ("inodes") to identify files and file attributes (such as creation time, access permissions, size and block location). The file system uses files to store meta-data describing the layout of its file system; these meta-data files include, among others, an inode file. A file handle, i.e., an identifier that includes an inode number, is used to retrieve an inode from disk.

Broadly stated, all inodes of the write-anywhere file system are organized into the inode file. A file system (fs) info block specifies the layout of information in the file system and includes an inode of a file that includes all other inodes of the file system. Each logical volume (file system) has an fsinfo block that is preferably stored at a fixed location within, e.g., a RAID group. The inode of the inode file may directly reference (point to) data blocks of the inode file or may reference indirect blocks of the inode file that, in turn, reference data blocks of the inode file. Within each data block of the inode file are embedded inodes, each of which may reference indirect blocks that, in turn, reference data blocks of a file.

Operationally, a request from the client 110 is forwarded as a packet over the connection system 120 and onto the node 100 where it is received at the network adapter 240. A network driver (of layer 312 or layer 330) processes the packet and, if appropriate, passes it on to a network protocol and file access layer for additional processing prior to forwarding to the write-anywhere file system 360. Here, the file system generates operations to load (retrieve) the requested data from the disk 150 if it is not resident "in core", i.e., in memory 220. If the information is not in the memory 220, the file system 360 indexes into the inode file using the inode number to access an appropriate entry and retrieve a logical vbn. The file system then passes a message structure including the logical vbn to the RAID system 380; the logical vbn is mapped to a disk identifier and disk block number (disk,dbn) and sent to an appropriate driver (e.g., SCSI) of the disk driver system 390. The disk driver accesses the dbn from the specified disk 150 and loads the requested data block(s) in memory for processing by the node. Upon completion of the request, the node (and operating system) returns a reply to the client 110 over the connection system 120.

It should be noted that the software "path" through the storage operating system layers described above needed to perform data storage access for the client request received at the node may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by the node 100 in response to a request issued by the client 110. Moreover, in another alternate embodiment of the invention, the processing elements of the adapters 240, 280 may be configured to offload some or all of the packet processing and storage access operations, respectively, from processors 210a, 210b, to thereby increase the performance of the storage service provided by the node. It is expressly contemplated that the various processes, architectures and procedures described herein can be implemented in hardware, firmware or software.

As used herein, the term "storage operating system" generally refers to the computer-executable code operable on a computer to perform a storage function that manages data access and may, in the case of a node 100, implement data access semantics of a general purpose operating system. The storage operating system can also be implemented as a microkernel, an application program operating over a general-purpose operating system, such as UNIX® or Windows NT®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems. It should be noted that while this description is written in terms of a write anywhere file system, the teachings of the present invention may be utilized with any suitable file system, including a write in-place file system.

In an exemplary embodiment, the storage server 365 is embodied as D-blade 170 of the storage operating system 230 to service one or more volumes of disk array 140. In addition, the multi-protocol engine 310 is embodied as N-blade 160 to (i) perform protocol termination with respect to a client issuing incoming data access request packets over the connection system 120, as well as (ii) redirect those data access requests to any storage server 365 of the cluster. Moreover, the N-blade 160 and D-blade 170 cooperate to provide a highly-scalable, distributed storage system architecture of a clustered computing environment implementing exemplary embodiments of the present invention. To that end, each blade includes a cluster fabric (CF) interface module 340a, 340b adapted to implement intra-cluster communication among the blades, including D-blade-to-D-blade communication for data container striping operations described herein.

The protocol layers, e.g., the NFS/CIFS layers and the iSCSI/FC layers, of the N-blade 160 function as protocol servers that translate file-based and block based data access requests from clients into CF protocol messages 370 used for communication with the D-blade 170. That is, the N-blade servers convert the incoming data access requests into file system primitive operations (commands) that are embedded within CF protocol messages 370 by the CF interface module 340 for transmission to the D-blades 170 of the cluster. Notably, the CF interface modules 340 cooperate to provide a single file system image across all D-blades 170 in the cluster. Thus, any network port of an N-blade 160 that receives a client request can access any data container within the single file system image located on any D-blade 170 of the cluster.

Further to the illustrative embodiment, the N-blade 160 and D-blade 170 are implemented as separately-scheduled processes of storage operating system 230; however, in an alternate embodiment, the blades may be implemented as pieces of code within a single operating system process. Communication between an N-blade and D-blade is thus illustratively effected through the use of message passing between the blades although, in the case of remote communication between an N-blade and D-blade of different nodes, such message passing occurs over the cluster switching fabric 130. A known message-passing mechanism provided by the storage operating system to transfer information between blades (processes) is the Inter Process Communication (IPC) mechanism. The protocol used with the IPC mechanism is illustratively a generic file and/or block-based "agnostic" CF protocol that comprises a collection of methods/functions constituting a CF application programming interface (API). Examples of such agnostic protocols are the SpinFS and SpinNP protocols available from Network Appliance, Inc. The SpinFS protocol is described in the above-referenced U.S. Patent Application Publication No. US 2002/0116593.

The CF interface module 340 implements the CF protocol for communicating file system commands among the blades of cluster. Communication is illustratively effected by the D-blade exposing the CF API to which an N-blade (or another D-blade) issues calls. To that end, the CF interface module 340 is organized as a CF encoder and CF decoder. The CF encoder of, e.g., CF interface 340a on N-blade 160 encapsulates a CF message as (i) a local procedure call (LPC) when communicating a file system command to a D-blade 170 residing on the same node 100 or (ii) a remote procedure call (RPC) when communicating the command to a D-blade residing on a remote node of the cluster. In either case, the CF decoder of CF interface 340b on D-blade 350 de-encapsulates the CF message and processes the file system command.

Figure 4A:
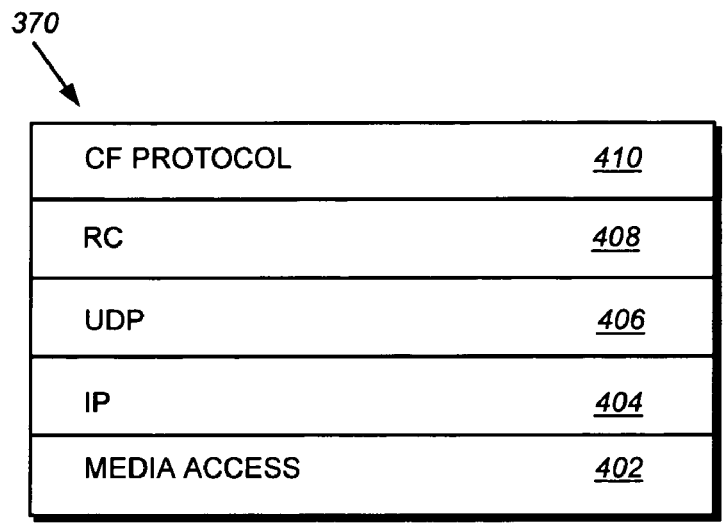
FIG. 4A is a diagram illustrating the format of a cluster fabric (CF) message, in accordance with an embodiment of the invention.

FIG. 4A is a diagram illustrating the format of a cluster fabric (CF) protocol message 370, in accordance with an embodiment of the invention. The CF protocol message 370, alternatively referred to as a CF message, is illustratively used for RPC communication over the cluster switching fabric 130 between remote blades of the cluster. However, it should be understood that the term "CF message" may be used generally to refer to LPC and RPC communication between blades of the cluster. The CF message 370 includes a media access layer 402, an IP layer 404, a UDP layer 406, a reliable connection (RC) layer 408 and a CF protocol layer 410. As noted, the CF protocol is a generic file system protocol that conveys file system commands related to operations contained within client requests to access data containers stored on the clustered computing environment. The CF protocol layer 410 is that portion of CF message 370 that carries the file system commands. Illustratively, the CF protocol is datagram-based and, as such, involves transmission of messages or "envelopes" in a reliable manner from a source (e.g., an N-blade 160) to a destination (e.g., a D-blade 170). The RC layer 408 implements a reliable transport protocol that is adapted to process such envelopes in accordance with a connectionless protocol, such as UDP 406.

Figure 4B:
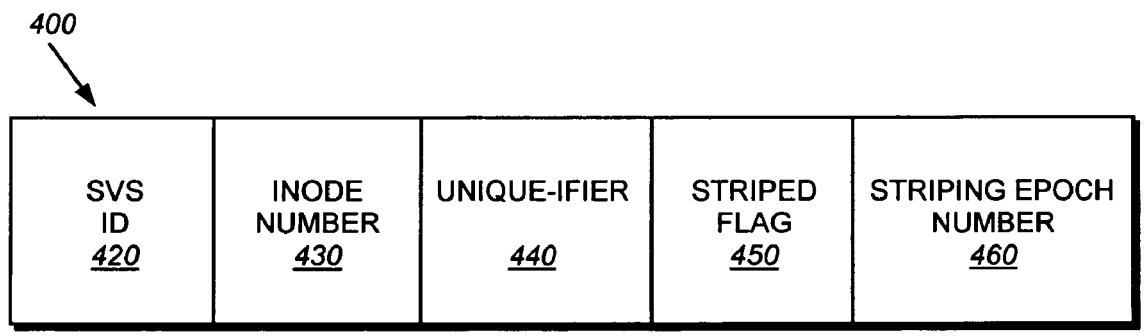
FIG. 4B is a diagram further illustrating a format of a data container handle, in accordance with an embodiment of the invention.

FIG. 4B is a diagram further illustrating a format of a data container handle 400, in accordance with an embodiment of the invention. Specifically, a data container, e.g., a file, is accessed in the file system using a data container handle. The data container handle 400 includes an SVS ID field 420, an inode number field 430, a unique-ifier field 440, a striped flag field 450, and a striping epoch number field 460. The SVS ID field 420 contains a global identifier (within the cluster) of the SVS within which the data container resides. The inode number field 430 contains an inode number of an inode (within an inode file) pertaining to the data container. The unique-ifier field 440 contains a monotonically increasing number that uniquely identifies the data container handle 400. The unique-ifier is particularly useful in the case where an inode number has been deleted, reused and reassigned to a new data container. The unique-ifier distinguishes that reused inode number in a particular data container from a potentially previous use of those fields. The striped flag field 450 may be a Boolean value that identifies whether the data container 400 is striped or not. Further, the striping epoch number field 460 indicates the appropriate striping technique for use with this data container for embodiments where the SVS utilizes differing striping techniques for different data containers 400. An exemplary striping technique that advantageously permits load balancing among nodes 100 of the clustered computing environment is the round-robin load balancing technique. It should be appreciated that round-robin is purely exemplary and other striping techniques are possible, as long at the striping technique permits load balancing within the cluster.

Figure 5:
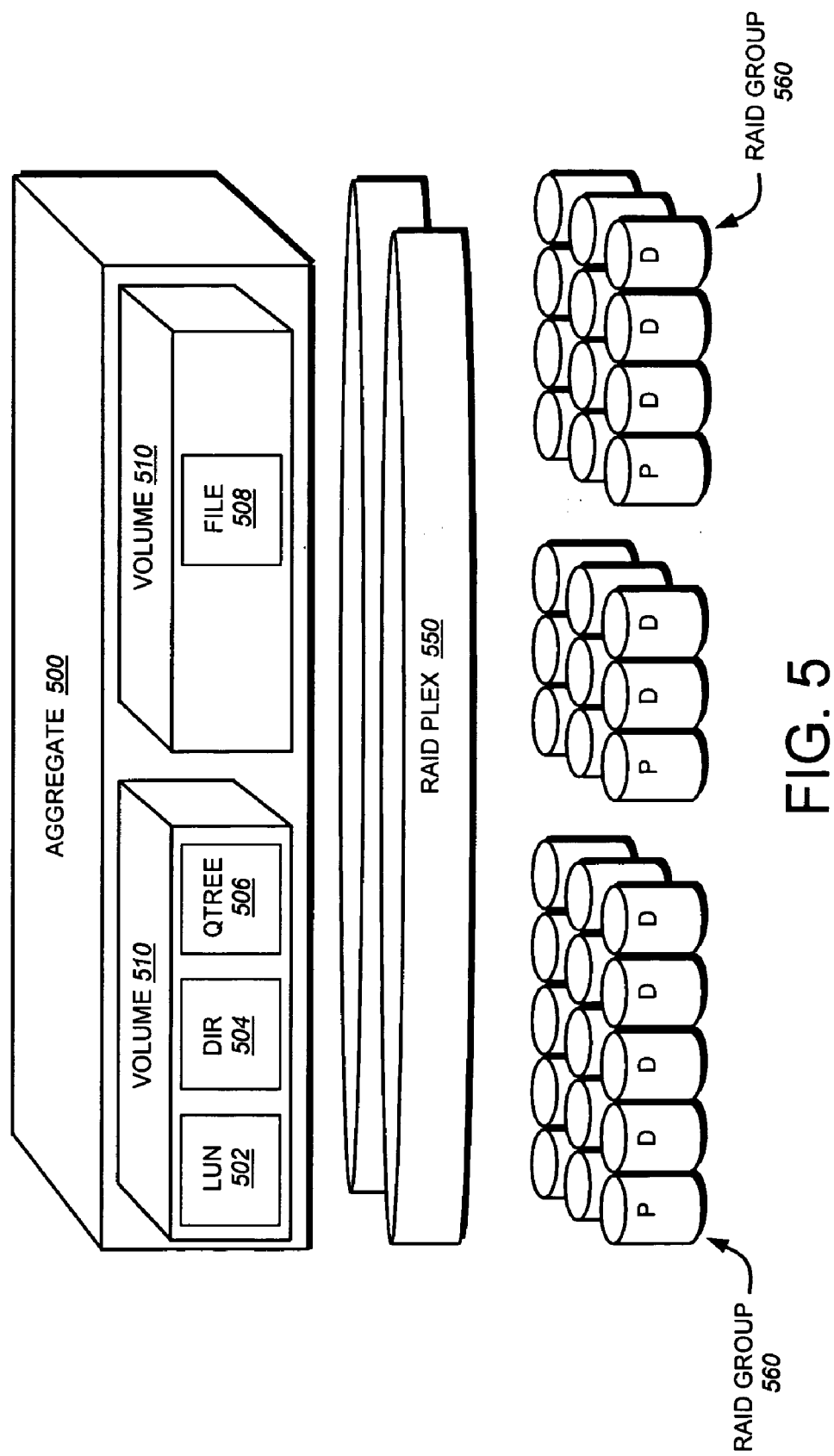
FIG. 5 is a diagram illustrating an exemplary aggregate, in accordance with an embodiment of the invention.

The volumes organized by the file system 360 of the D-blade 170 are further organized as aggregates. FIG. 5 is a diagram illustrating an exemplary aggregate 500, in accordance with an embodiment of the invention. Luns (blocks) 502, directories 504, qtrees 506 and files 508 may be contained within volumes 510, such as dual vbn flexible volumes, that, in turn, are contained within the aggregate 500. The aggregate 500 is illustratively layered on top of the RAID system 380, which is represented by at least one RAID plex 550 (depending upon whether the storage configuration is mirrored), wherein each plex 550 comprises at least one RAID group 560. Each RAID group further comprises a plurality of disks 150, e.g., one or more data (D) disks and at least one (P) parity disk.

Whereas the aggregate 500 is analogous to a physical volume of a conventional storage system, the volume 510, such as a flexible volume, is analogous to a file within that physical volume. That is, the aggregate 500 may include one or more files, wherein each file contains a flexible volume and wherein the sum of the storage space consumed by the flexible volumes is physically smaller than (or equal to) the size of the overall physical volume. The aggregate 500 utilizes a physical pvbn space that defines a storage space of blocks provided by the disks of the physical volume, while each embedded flexible volume (within a file) utilizes a logical vvbn space to organize those blocks, e.g., as files. Each vvbn space is an independent set of numbers that corresponds to locations within the file, which locations are then translated to dbns on disks. Since the flexible volume is also a logical volume, it has its own block allocation structures (e.g., active, space and summary maps) in its vvbn space.

A container file is a file in the aggregate that contains all blocks used by a flexible volume. The container file is an internal (to the aggregate) feature that supports a flexible volume; illustratively, there is one container file per flexible volume. Similar to a pure logical volume in a file approach, the container file is a hidden file (not accessible to a user) in the aggregate that holds every block in use by the flexible volume. The aggregate includes an illustrative hidden metadata root directory that contains subdirectories of flexible volumes:

WAFL/fsid/filesystem file, storage label file

Specifically, a physical file system (WAFL) directory includes a subdirectory for each flexible volume in the aggregate, with the name of subdirectory being a file system identifier (fsid) of the flexible volume. Each fsid subdirectory (flexible volume) contains at least two files, a filesystem file and a storage label file. The storage label file is illustratively a 4 kB file that contains meta-data similar to that stored in a conventional raid label. In other words, the storage label file is the analog of a raid label and, as such, contains information about the state of the flexible volume such as, e.g., the name of the flexible volume, a universal unique identifier (uuid) and fsid of the flexible volume, whether it is online, being created or being destroyed, etc.

In an exemplary embodiment, a data container is represented in the write-anywhere file system as an inode data structure adapted for storage on the disks 150. An inode (not shown) includes a meta-data section (not shown) and a data section (not shown). The information stored in the meta-data section of each inode describes the data container (e.g., a file) and, as such, includes the type (e.g., regular, directory, vdisk) of file, its size, time stamps (e.g., access and/or modification time) and ownership, i.e., user identifier (UID) and group ID (GID), of the file. The meta-data section also includes a generation number, and a meta-data invalidation flag field. As described further herein, the meta-data invalidation flag field is used to indicate whether meta-data in this inode is usable or whether it should be re-acquired from the MDV (see FIG. 10). The contents of the data section of each inode may be interpreted differently depending upon the type of file (inode) defined within the type field. For example, the data section of a directory inode contains meta-data controlled by the file system, whereas the data section of a regular inode contains file system data. In this latter case, the data section includes a representation of the data associated with the file.

Specifically, the data section of a regular on-disk inode may include file system data or pointers, the latter referencing 4 kB data blocks on disk used to store the file system data. Each pointer is preferably a logical vbn to facilitate efficiency among the file system and the RAID system 380 when accessing the data on disks. Given the restricted size (e.g., 128 bytes) of the inode, file system data having a size that is less than or equal to 64 bytes is represented, in its entirety, within the data section of that inode. However, if the length of the contents of the data container exceeds 64 bytes but less than or equal to 64 kB, then the data section of the inode (e.g., a first level inode) comprises up to 16 pointers, each of which references a 4 kB block of data on the disk.

Moreover, if the size of the data is greater than 64 kB but less than or equal to 64 megabytes (MB), then each pointer in the data section of the inode (e.g., a second level inode) references an indirect block (e.g., a first level L1 block) that contains 1024 pointers, each of which references a 4 kB data block on disk. For file system data having a size greater than 64 MB, each pointer in the data section of the inode (e.g., a third level L3 inode) references a double-indirect block (e.g., a second level L2 block) that contains 1024 pointers, each referencing an indirect (e.g., a first level L1) block. The indirect block, in turn, that contains 1024 pointers, each of which references a 4 kB data block on disk. When accessing a file, each block of the file may be loaded from disk 150 into the memory 220.

When an on-disk inode (or block) is loaded from disk 150 into memory 220, its corresponding in-core structure embeds the on-disk structure. The in-core structure is a block of memory that stores the on-disk structure plus additional information needed to manage data in the memory (but not on disk). The additional information may include, e.g., a "dirty" bit. After data in the inode (or block) is updated/modified as instructed by, e.g., a write operation, the modified data is marked "dirty" using the dirty bit so that the inode (block) can be subsequently "flushed" (stored) to disk. The in-core and on-disk format structures of the WAFL file system, including the inodes and inode file, are disclosed and described in the previously incorporated U.S. Pat. No. 5,819,292 titled METHOD FOR MAINTAINING CONSISTENT STATES OF A FILE SYSTEM AND FOR CREATING USER-AC- CESSIBLE READ-ONLY COPIES OF A FILE SYSTEM by David Hitz et al., issued on Oct. 6, 1998.

Figure 6A:
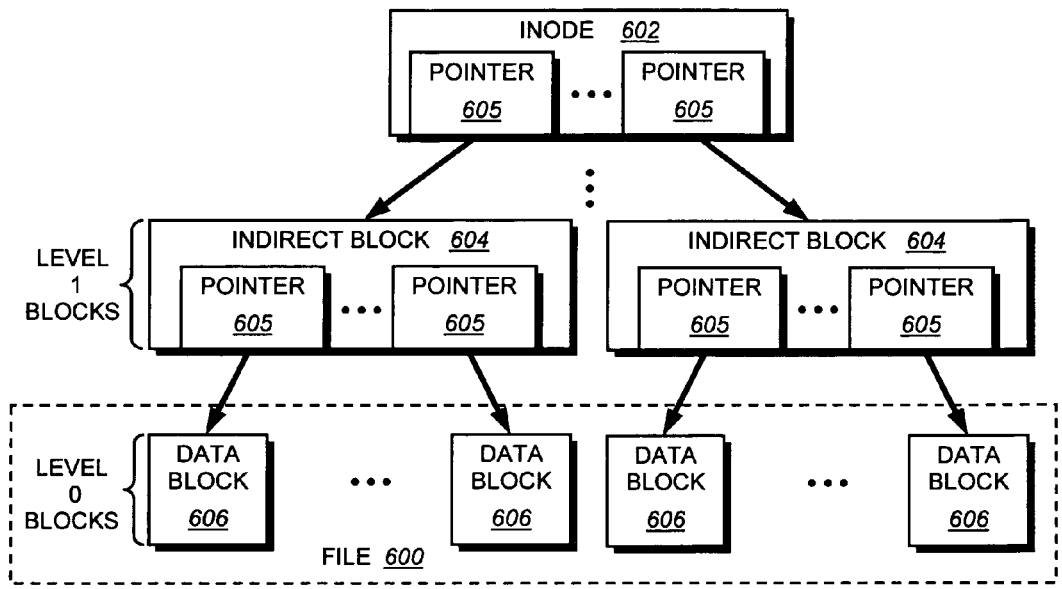
FIG. 6A is a diagram illustrating an exemplary buffer tree, in accordance with an embodiment of the invention.

FIG. 6A is a diagram illustrating an exemplary buffer tree, in accordance with an embodiment of the invention. Specifically, the buffer tree is an internal representation of blocks for a file (e.g., file 600) loaded into the memory 220 and maintained by the write-anywhere file system 360. A root (top-level) inode 602, such as an embedded inode, references indirect (e.g., level 1) blocks 604. Note that there may be additional levels of indirect blocks (e.g., level 2, level 3) depending upon the size of the file. The indirect blocks (and inode) contain pointers 605 that ultimately reference data blocks 606 used to store the actual data of the file. That is, the data of file 600 are contained in data blocks and the locations of these blocks are stored in the indirect blocks of the file. Each level 1 indirect block 604 may contain pointers to as many as 1024 data blocks. According to the "write anywhere" nature of the file system, these blocks may be located anywhere on the disks 150.

A file system layout is provided that apportions an underlying physical volume into one or more virtual volumes (or flexible volume) of a storage system, such as node 100. An example of such a file system layout is described in U.S. patent application Ser. No. 10/836,817 titled EXTENSION OF WRITE ANYWHERE FILE SYSTEM LAYOUT, by John K. Edwards et al. and assigned to Network Appliance, Inc. The underlying physical volume is the aggregate 500 comprising one or more groups of disks, such as RAID groups, of the node 100. The aggregate 500 has its own physical volume block number (pvbn) space and maintains meta-data, such as block allocation structures, within that pvbn space. Each flexible volume has its own virtual volume block number (vvbn) space and maintains meta-data, such as block allocation structures, within that vvbn space. Each flexible volume is a file system that is associated with a container file; the container file is a file in the aggregate that contains all blocks used by the flexible volume. Moreover, each flexible volume comprises data blocks and indirect blocks that contain block pointers that point at either other indirect blocks or data blocks.

In one embodiment, pvbns are used as block pointers within buffer trees of files (such as file 600) stored in a flexible volume. This "hybrid" flexible volume embodiment involves the insertion of only the pvbn in the parent indirect block (e.g., inode or indirect block). On a read path of a logical volume, a "logical" volume (vol) info block has one or more pointers that reference one or more fsinfo blocks, each of which, in turn, points to an inode file and its corresponding inode buffer tree. The read path on a flexible volume is generally the same, following pvbns (instead of vvbns) to find appropriate locations of blocks; in this context, the read path (and corresponding read performance) of a flexible volume is substantially similar to that of a physical volume. Translation from pvbn-to-disk,dbn occurs at the file system/RAID system boundary of the storage operating system 230.

Figure 6B:
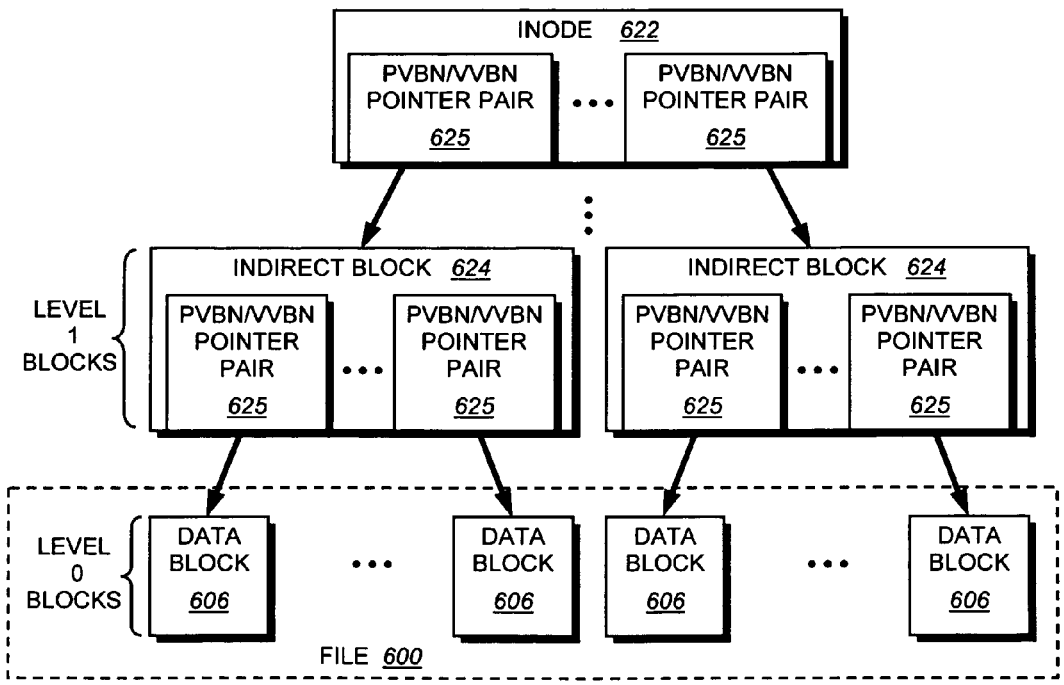
FIG. 6B is a diagram illustrating another exemplary buffer tree, in accordance with an embodiment of the invention.

In an illustrative dual vbn hybrid flexible volume embodiment, both a pvbn and its corresponding vvbn are inserted in the parent indirect blocks in the buffer tree of a file. That is, the pvbn and vvbn are stored as a pair for each block pointer in most buffer tree structures that have pointers to other blocks, e.g., level 1(L1) indirect blocks, inode file level 0 (L0) blocks. FIG. 6B is a diagram illustrating another exemplary buffer tree, in accordance with an embodiment of the invention. A root (top-level) inode 622, such as an embedded inode, references indirect (e.g., level 1) blocks 624. Note that there may be additional levels of indirect blocks (e.g., level 2, level 3) depending upon the size of the file. The indirect blocks (and inode) contain pvbn/vvbn pointer pair structures 625 that ultimately reference data blocks 606 used to store the actual data of the file.

The pvbns reference locations on disks of the aggregate, whereas the vvbns reference locations within files of the flexible volume. The use of pvbns as block pointers 625 in the indirect blocks 624 provides efficiencies in the read paths, while the use of vvbn block pointers provides efficient access to required meta-data. That is, when freeing a block of a file, the parent indirect block in the file contains readily available vvbn block pointers, which avoids the latency associated with accessing an owner map to perform pvbn-to-vvbn translations; yet, on the read path, the pvbn is available.

Figure 7:
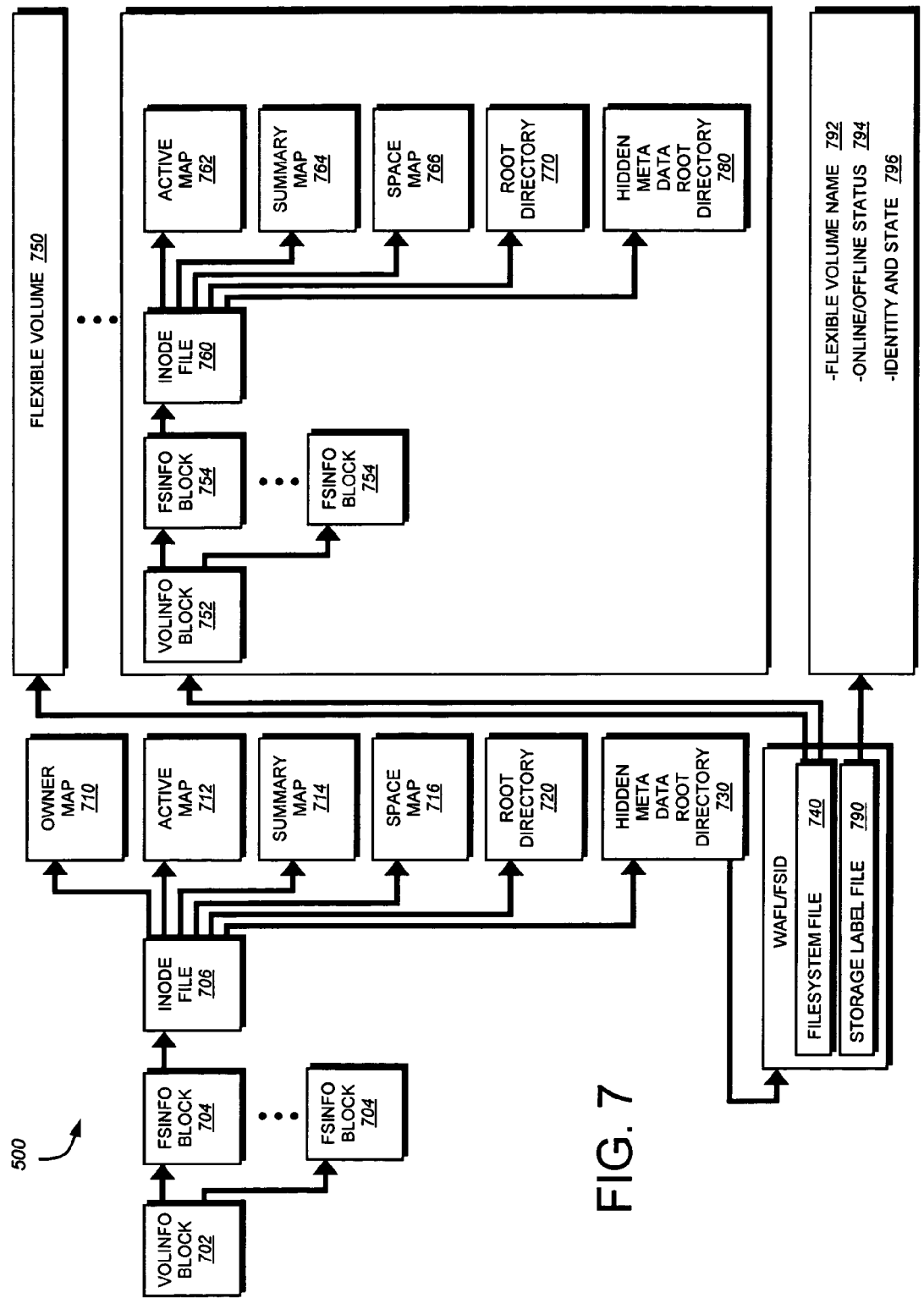
FIG. 7 is a diagram illustrating an exemplary on-disk layout of the aggregate, in accordance with an embodiment of the invention.

FIG. 7 is a diagram illustrating an exemplary on-disk layout of the aggregate 500, in accordance with an embodiment of the invention. The storage operating system 230, e.g., the RAID system 380, assembles a physical volume of pvbns to create the aggregate 500, with pvbns 1 and 2 comprising a "physical" volinfo block 702 for the aggregate 500. The volinfo block 702 contains block pointers to fsinfo blocks 704, each of which may represent a snapshot of the aggregate 500. Each fsinfo block 704 includes a block pointer to an inode file 706 that contains inodes of a plurality of files, including an owner map 710, an active map 712, a summary map 714 and a space map 716, as well as other special meta-data files. The inode file 706 further includes a root directory 720 and a "hidden" meta-data root directory 730, the latter of which includes a namespace having files related to a flexible volume in which users cannot "see" the files. The hidden meta-data root directory includes the WAFL/fsid/ directory structure that contains filesystem file 740 and storage label file 790. Note that root directory 720 in the aggregate 500 is empty; all files related to the aggregate 500 are organized within the hidden meta-data root directory 730.

In addition to being embodied as a container file having level 1 blocks organized as a container map, the filesystem file 740 includes block pointers that reference various file systems embodied as flexible volumes 750. The aggregate 500 maintains these flexible volumes 750 at special reserved inode numbers. Each flexible volume 750 also has special reserved inode numbers within its flexible volume space that are used for, among other things, the block allocation bitmap structures. As noted, the block allocation bitmap structures, e.g., active map 762, summary map 764 and space map 766, are located in each flexible volume.

Specifically, each flexible volume 750 has the same inode file structure/content as the aggregate, with the exception that there is no owner map and no WAFL/fsid/filesystem file, storage label file directory structure in a hidden meta-data root directory 780. To that end, each flexible volume 750 has a volinfo block 752 that points to one or more fsinfo blocks 754, each of which may represent a snapshot, along with the active file system of the flexible volume. Each fsinfo block, in turn, points to an inode file 760 that, as noted, has the same inode structure/content as the aggregate with the exceptions noted above. Each flexible volume 750 has its own inode file 760 and distinct inode space with corresponding inode numbers, as well as its own root (fsid) directory 770 and subdirectories of files that can be exported separately from other flexible volumes.

The storage label file 790 contained within the hidden meta-data root directory 730 of the aggregate is a small file that functions as an analog to a conventional raid label. A raid label includes physical information about the storage system, such as the volume name; that information is loaded into the storage label file 790. Illustratively, the storage label file 790 includes the name 792 of the associated flexible volume 750, the online/offline status 794 of the flexible volume, and other identity and state information 796 of the associated flexible volume (whether it is in the process of being created or destroyed).

Figure 8A:
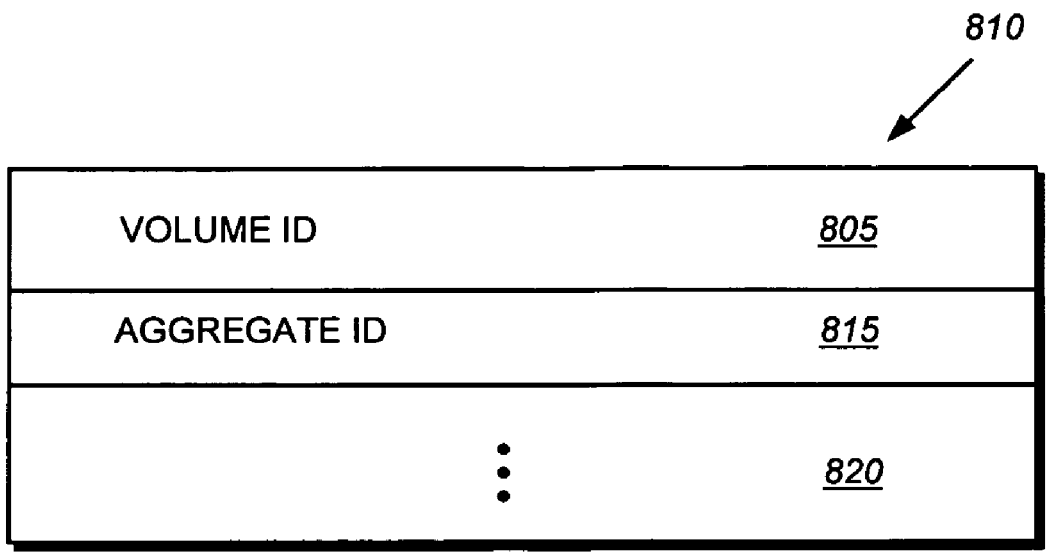
FIG. 8A is a diagram illustrating a volume location database (VLDB) volume entry, in accordance with an embodiment of the invention.
Figure 8B:
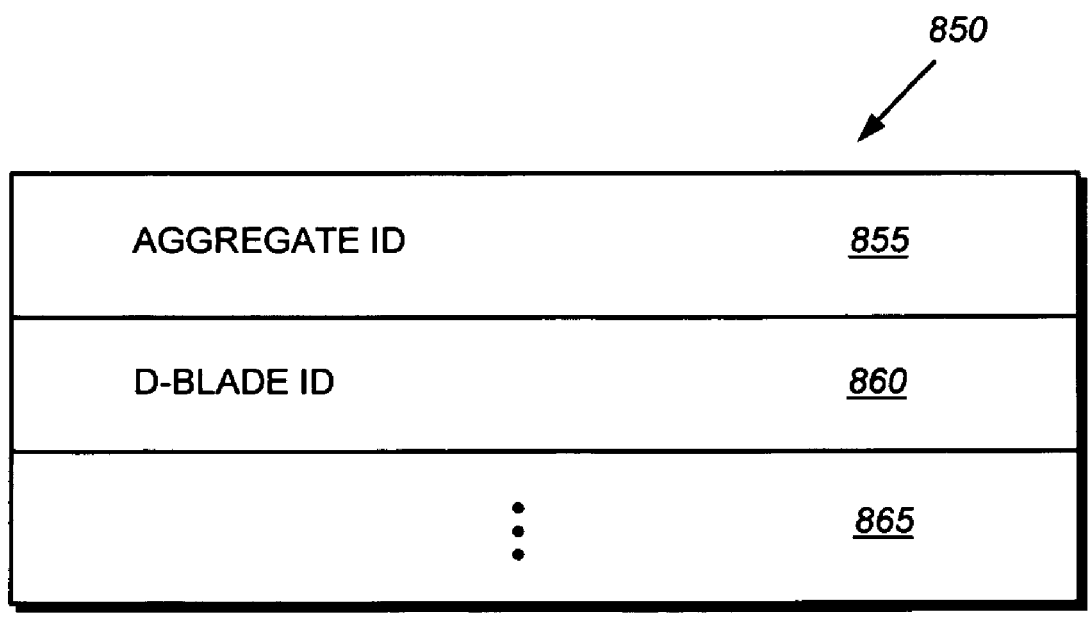
FIG. 8B is a diagram illustrating a VLDB aggregate entry, in accordance with an embodiment of the invention.

In an exemplary embodiment, the N-blade 160 of each node 100 accesses a configuration table 260 that maps the SVS ID 420 of a data container handle 400 to a D-blade 170 that "owns" (services) the data container within the clustered computing environment. A volume location database (VLDB) is capable of tracking the locations of volumes and aggregates of nodes 100. Specifically, the VLDB includes a plurality of entries which, in turn, provide the contents of entries in the configuration table 260; among other things, these VLDB entries keep track of the locations of the flexible volumes (hereinafter generally "volumes 510") and aggregates 500 within the clustered computing environment. FIG. 8A is a diagram illustrating an exemplary VLDB volume entry 810, in accordance with an embodiment of the invention. Further, FIG. 8B is a diagram illustrating an exemplary VLDB aggregate entry 850, in accordance with an embodiment of the invention. Thus, examples of VLDB entries include the VLDB volume entry 810 and the VLDB aggregate entry 850.

The VLDB entry 810 of FIG. 8A includes a volume ID field 805, an aggregate ID field 815 and, in alternate embodiments, additional fields 820. The volume ID field 805 contains an ID that identifies a volume 510 used in a volume location process. The aggregate ID field 815 identifies the aggregate 500 containing the volume identified by the volume ID field 805. Likewise, FIG. 8B illustrates an exemplary VLDB aggregate entry 850. The VLDB aggregate entry 850 includes an aggregate ID field 855, a D-blade ID field 860 and, in alternate embodiments, additional fields 865. The aggregate ID field 855 contains an ID of a particular aggregate 500 in the clustered computing environment. The D-blade ID field 860 contains an ID of the D-blade 170 hosting the particular aggregate identified by the aggregate ID field 855.

The VLDB illustratively implements a RPC interface, e.g., a Sun RPC interface, which allows the N-blade 160 to query the VLDB. When encountering contents of a data container handle 400 that are not stored in its configuration table, the N-blade 160 sends an RPC to an VLDB process, as described in reference to FIG. 9. In response, the VLDB process returns to the N-blade 160 the appropriate mapping information, including an ID of the D-blade 170 that owns the data container. The N-blade 160 caches the information in its configuration table 260 and uses the D-blade ID 860 to forward the incoming request to the appropriate data container. All functions and interactions, between the N-blade 160 and D-blade 170 are coordinated on a cluster-wide basis through the collection of management processes and the RDB library user mode applications, further described herein.

The present invention relates to a storage system architecture illustratively comprising two or more volumes 510 distributed across a plurality of nodes 100 of a clustered computing environment. The volumes 510 are organized as a SVS and configured to store content of data containers, such as files and luns, served by the cluster in response to multi-protocol data access requests issued by clients 110. Notably, the content of each data container is apportioned among the volumes of the SVS to thereby improve the efficiency of storage service provided by the clustered computing environment. To facilitate a description and understanding of the present invention, data containers are hereinafter referred to generally as "files."

According to an embodiment of the invention, the SVS comprises a meta-data volume (MDV) and one or more data volumes (DV). The MDV is configured to store a canonical copy of meta-data, including access control lists (ACLs) and directories, associated with all files stored on the SVS, whereas each DV is configured to store, at least, data content of those files. For each file stored on the SVS, one volume is designated the CAV and, to that end, is configured to store ("cache") certain, rapidly-changing attribute meta-data associated with that file to thereby offload access requests that would otherwise be directed to the MDV. In the illustrative embodiment described herein, determination of the CAV for a file is based on a simple rule: designate the volume holding the first stripe of content (data) for the file as the CAV for the file. Not only is this simple rule convenient, but it also provides an optimization for small files. That is, a CAV may be able to perform certain operations without having to communicate with other volumes of the SVS if the file is small enough to fit within the specified stripe width. Ideally, the first stripes of data for files are distributed among the DVs of the SVS to thereby facilitate even distribution of CAV designations among the volumes of the SVS. In an alternate embodiment, data for files is striped across the MDV and the DVs.

Figure 9:
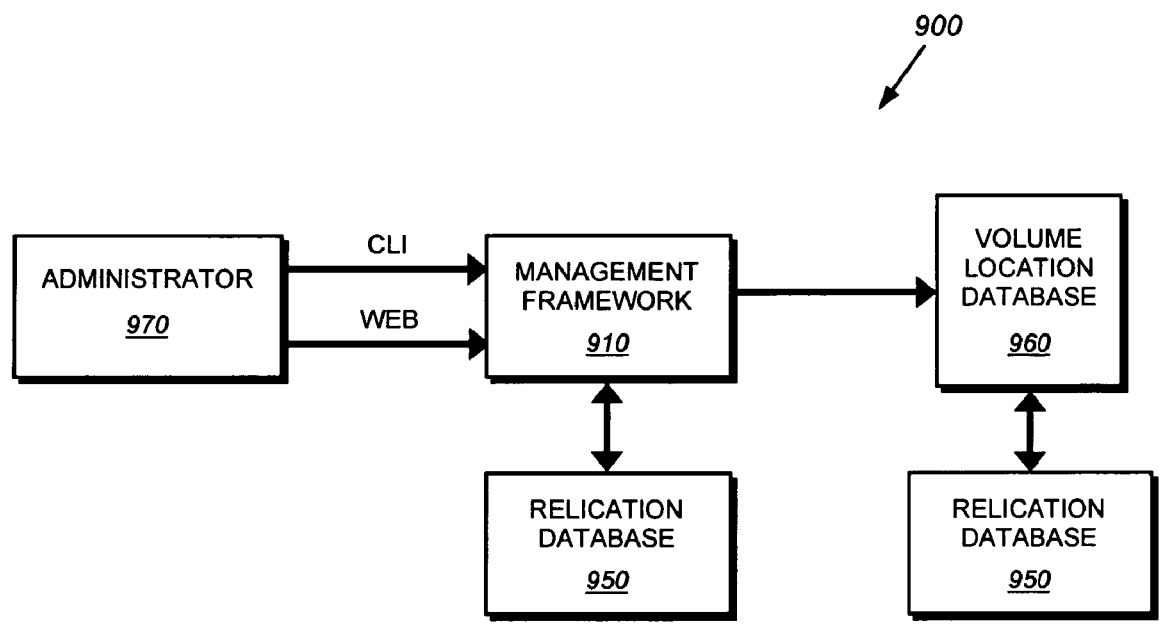
FIG. 9 is a diagram illustrating a collection of management processes, in accordance with an embodiment of the invention.

To manage the allocated data, which are striped across multiple volumes, FIG. 9 illustrates a collection of management processes, in accordance with an embodiment of the invention. The management processes execute as user mode applications 900 on the storage operating system 230 to provide management of configuration information (i.e. management data) for the nodes 100 of the clustered computing environment. To that end, the management processes include a management framework process 910 and a volume location database (VLDB) process 960, each utilizing a data replication service (RDB 950) linked as a library. The management framework 910 provides a user to an administrator 970 interface via a command line interface (CLI) and/or a web-based graphical user interface (GUI). The management framework is illustratively based on a conventional common interface model (CIM) object manager that provides the entity to which users/system administrators interact with a node 100 in order to manage the cluster. The VLDB process 960 is a database process that tracks the locations of various storage components (e.g., SVSs, flexible volumes, aggregates, etc.) within the cluster to thereby facilitate routing of requests throughout the cluster.

The management processes have interfaces to (are closely coupled to) RDB 950. The RDB comprises a library that provides a persistent object store (storing of objects) for the management data processed by the management processes. Notably, the RDB 950 replicates and synchronizes the management data object store access across all nodes 100 of the cluster to thereby ensure that the RDB database image is identical on all of the nodes 100. At system startup, each node 100 records the status/state of its interfaces and IP addresses (those IP addresses it "owns") into the RDB database.

Figure 10:
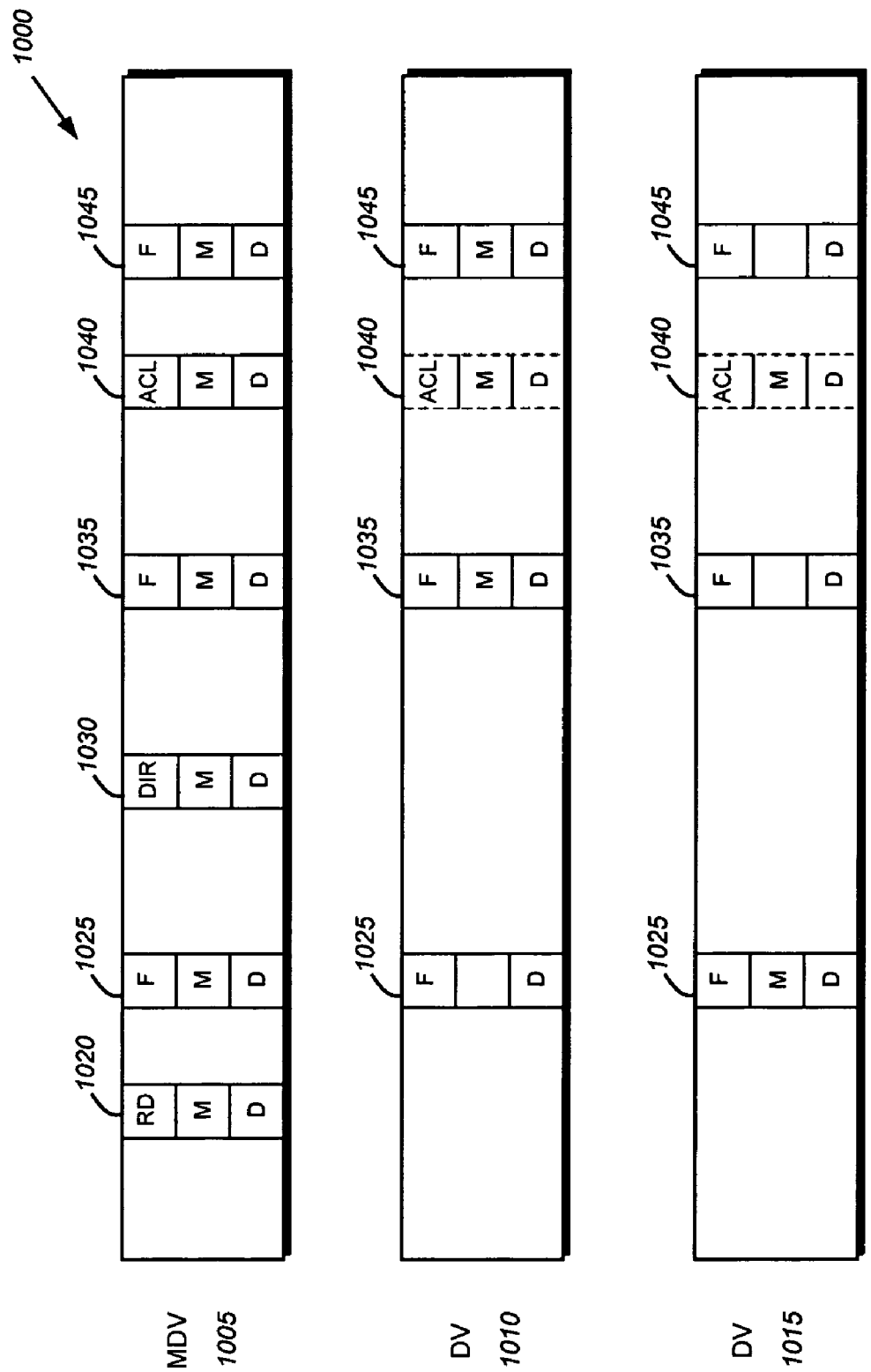
FIG. 10 is a diagram illustrating a striped volume set (SVS), in accordance with an embodiment of the invention.

According to the storage system architecture described herein, a plurality of SVS operations enable efficient and accurate serving of file (and other data container) content distributed across volumes of a SVS. These SVS operations include, among others, create file, delete file, retrieve attributes of file, write/modify attributes of file, read file and write file operations. FIG. 10 is a diagram illustrating a striped volume set (SVS) 1000, in accordance with an embodiment of the invention. The SVS 1000 illustratively comprises three volumes, namely MDV 1005 and two DVs 1010, 1015. It should be noted that in alternate embodiments additional and/or differing numbers of volumes may be utilized in accordance with the present invention. Illustratively, the MDV 1005 stores a plurality of inodes, including a root directory (RD) inode 1020, a directory (DIR) inode 1030, file (F) inodes 1025, 1035, 1045 and an ACL inode 1040. Each of these inodes illustratively includes meta-data (M) associated with the inode. In the illustrative embodiment, each inode on the MDV 1005 does not include data (D); however, in alternate embodiments, the MDV may include user data.

In contrast, each DV 1010, 1015 stores only file (F) inodes 1025, 1035, 1045 and ACL inode 1040. According to the inventive architecture, a DV does not store directories or other device inodes/constructs, such as symbolic links; however, each DV does store F inodes, and may store cached copies of ACL inodes, that are arranged in the same locations as their respective inodes in the MDV 1005. A particular DV may not store a copy of an inode until an I/O request for the data container associated with the inode is received by the D-blade serving a particular DV. Moreover, the contents of the files denoted by these F inodes are periodically sparse according to SVS striping rules, as described further herein. In addition, since one volume is designated the CAV for each file stored on the SVS 1000, DV 1015 is designated the CAV for the file represented by inode 1025 and DV 1010 is the CAV for the files identified by inodes 1035, 1045. Accordingly, these CAVs cache certain, rapidly-changing attribute meta-data (M) associated with those files such as, e.g., file size, as well as access and/or modification time stamps.

Figure 11:
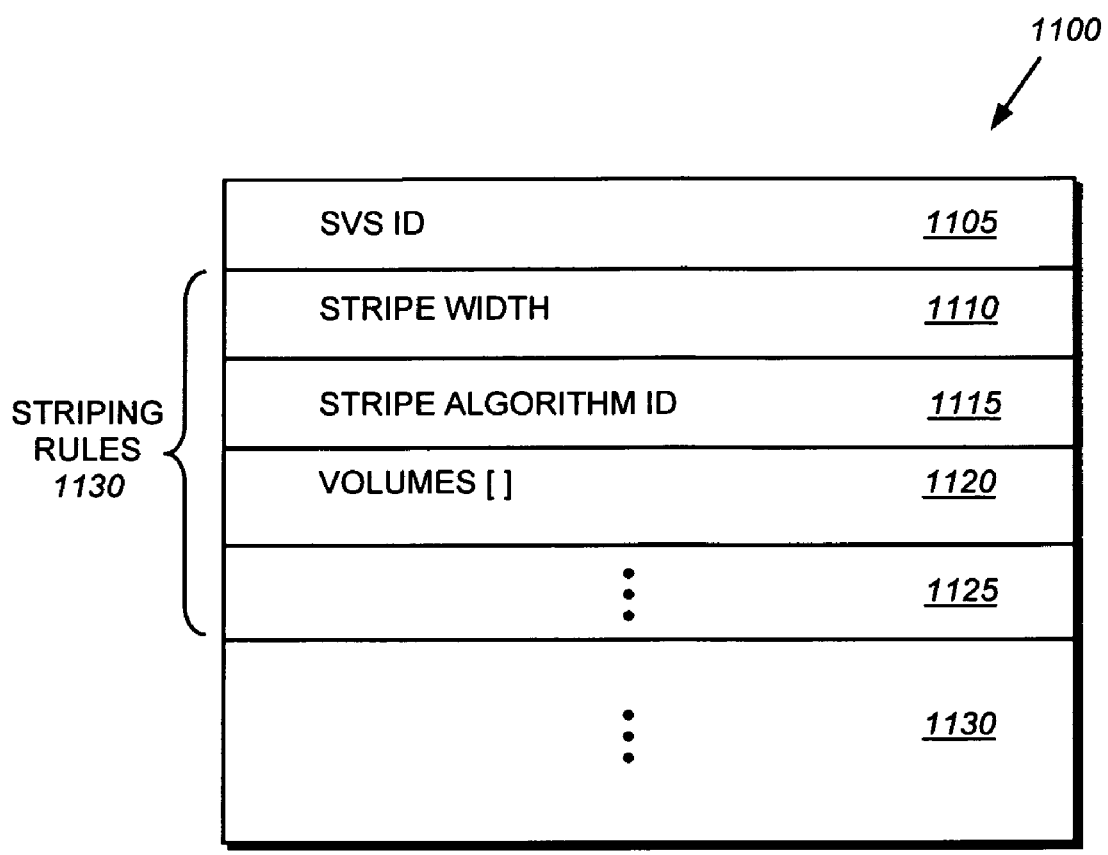
FIG. 11 is a diagram illustrating a VLDB SVS entry, in accordance with an embodiment the invention.

According to another aspect of the invention, the SVS is associated with a set of striping rules that define a stripe algorithm, a stripe width and an ordered list of volumes within the SVS. The striping rules for each SVS are illustratively stored as an entry of VLDB process 960 and accessed by SVS ID. FIG. 11 is a diagram illustrating a VLDB SVS entry 1100, in accordance with an embodiment the invention. The VLDB entry 1100 includes a SVS ID field 1105 and one or more sets of striping rules 1130. In alternate embodiments additional fields 1135 may be included. The SVS ID field 1105 contains the ID of a SVS which, in operation, is specified in data container handle 400.

Each set of striping rules 1130 illustratively includes a stripe width field 1110, a stripe algorithm ID field 1115, an ordered list of volumes field 1120 and, in alternate embodiments, additional fields 1125. The striping rules 1130 contain information for identifying the organization of a SVS. For example, the stripe algorithm ID field 1115 identifies a striping algorithm used with the SVS. In the illustrative embodiment, multiple striping algorithms could be used with a SVS; accordingly, stripe algorithm ID is needed to identify which particular algorithm is utilized. Each striping algorithm, in turn, specifies the manner in which file content is apportioned as stripes across the plurality of volumes of the SVS.

The stripe width field 1110 specifies the size/width of each stripe. The ordered list of volumes field 1120 contains the IDs of the volumes comprising the SVS. In an illustrative embodiment, the ordered list of volumes comprises a plurality of tuples comprising of a flexible volume ID and the aggregate ID storing the flexible volume. Moreover, the ordered list of volumes may specify the function and implementation of the various volumes and striping rules of the SVS. For example, the first volume in the ordered list may denote the MDV of the SVS, whereas the ordering of volumes in the list may denote the manner of implementing a particular striping algorithm, e.g., round-robin. 194 To determine the location of a D-blade 170 to which to transmit a CF message 370, the N-blade 160 may first retrieve a SVS entry 1100 to acquire the striping rules 1130 (and list of volumes 1120) associated with the SVS. The N-blade 160 then executes a process to locate, such as a Locate( ) function (not shown) to identify the appropriate volume to which to direct an operation. Thereafter, the N-blade 160 may retrieve the appropriate VLDB volume entry 810 to identify the aggregate containing the volume and the appropriate VLDB aggregate entry 850 to ultimately identify the appropriate D-blade 170. The protocol server of N-blade 310 then transmits the CF message 370 to the D-blade 170.

Figure 12:
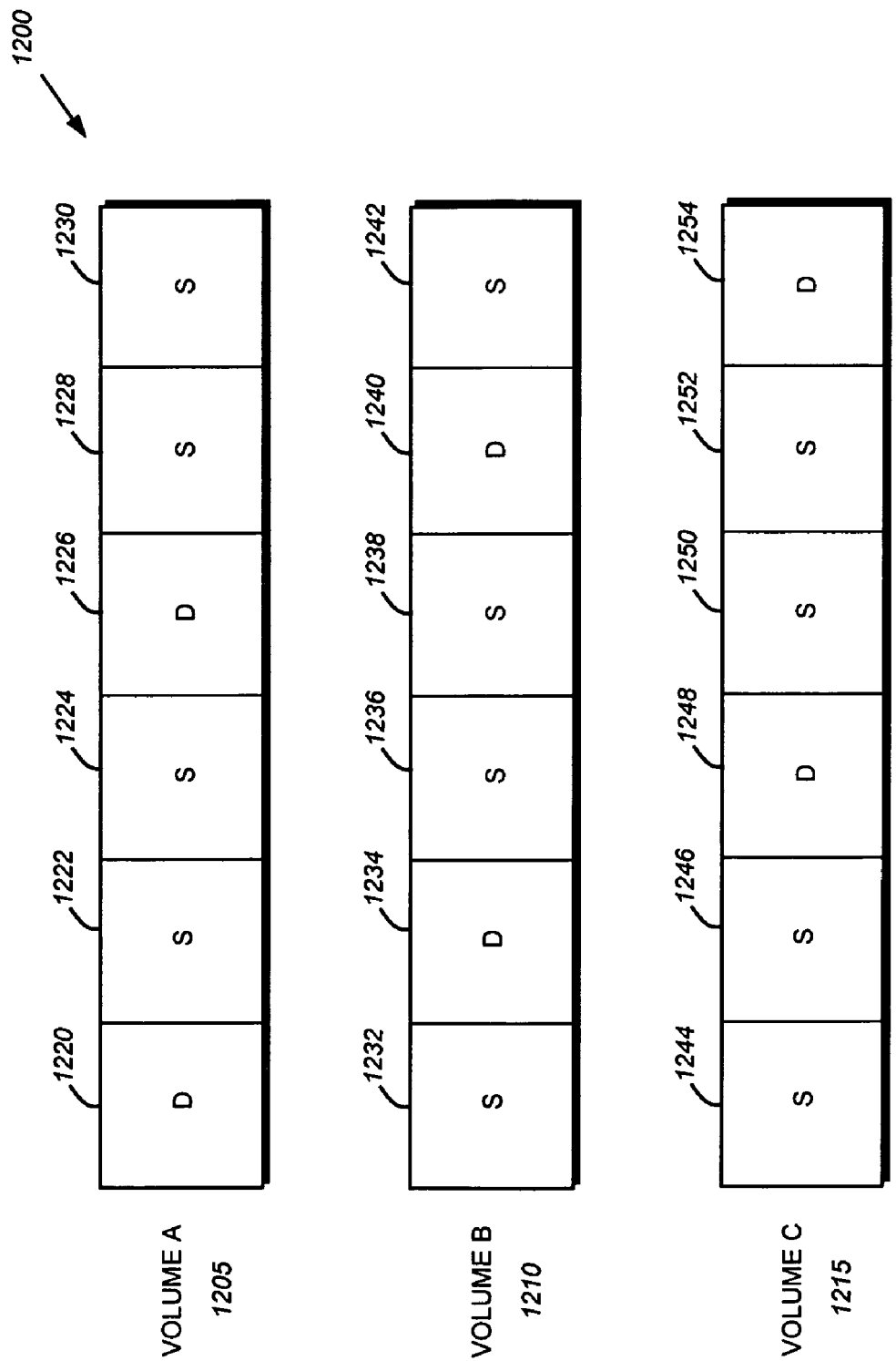
FIG. 12 is a diagram illustrating the periodic sparseness of file content stored on volumes of a SVS, in accordance with an embodiment of the invention.

FIG. 12 is a diagram illustrating the periodic sparseness of file content stored on volumes of a SVS, in accordance with an embodiment of the invention. Sparseness means that a stripe of a volume of the SVS does not contain file content or data. Exemplary volumes include volumes A 1205, B 1210, and C 1215 of SVS 1200. As noted, file content is periodically sparse, according to the SVS striping rules, which specify a striping algorithm (as indicated by stripe algorithm ID field 1115) and a size/width of each stripe (as indicated by stripe width field 1110). Note that, in the illustrative embodiment, a stripe width is selected to ensure that each stripe may accommodate the actual data (e.g., stored in data blocks 606) referenced by an indirect block (e.g., level 1 block 604) of a file.

In accordance with an illustrative round robin striping algorithm, volume A 1205 contains a stripe of file content or data (D) 1220 followed, in sequence, by two stripes of sparseness (S) 1222, 1224, another stripe of data (D) 1226 and two stripes of sparseness (S) 1228, 1230. Volume B 1210, on the other hand, contains a stripe of sparseness (S) 1232 followed, in sequence, by a stripe of data (D) 1234, two stripes of sparseness (S) 1236, 1238, another stripe of data (D) 1240 and a stripe of sparseness (S) 1242. Volume C 1215 continues the round robin striping pattern and, to that end, contains two stripes of sparseness (S) 1244, 1246 followed, in sequence, by a stripe of data (D) 1248, two stripes of sparseness (S) 1250, 1252 and another stripe of data (D) 1254.

Figure 13A:
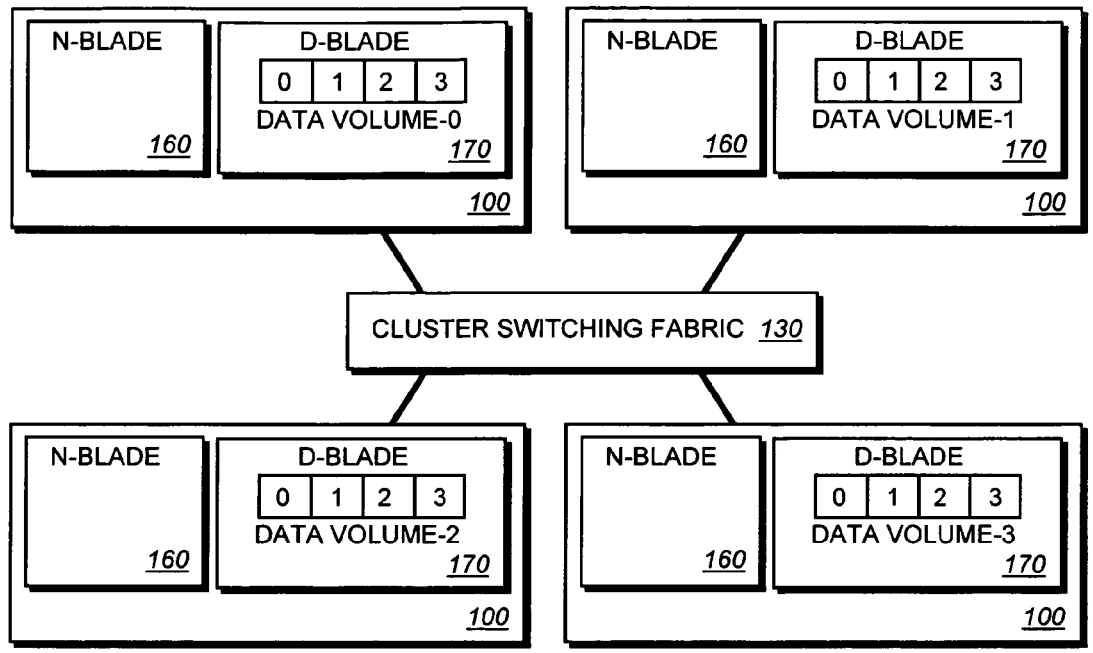
FIG. 13A is a diagram illustrating the allocation of data distributed among a plurality of volumes of a storage system architecture, in accordance with an embodiment of the invention.

FIG. 13A is a diagram illustrating the allocation of data distributed among a plurality of volumes of a storage system architecture, in accordance with an embodiment of the invention. Within a clustered computing environment, it should be appreciated that any number of volumes of varying lengths can be implemented by the embodiments of the present invention for allocating striped data. Specifically, although one volume is allocated to each node 100, wherein each node 100 is a storage system of the clustered computing environment, any number of volumes can be allocated per node 100. For example, multiple nodes 100 communicate with one another via the cluster switching fabric 130. Specifically, the N/D-blades of the nodes 100 communicate as described above. Each D-blade 170 includes a volume such that each volume can store striped data. For example, as illustrated by FIG. 13B, data volume-0 (DV-0) can store a stripe of data at a first location, data volume-1 (DV-1) can store a stripe of data at a second location, data volume-2 (DV-2) can store a stripe of data at a third location, and data volume (DV-3) can store a stripe of data at a fourth location.

Figure 13B:
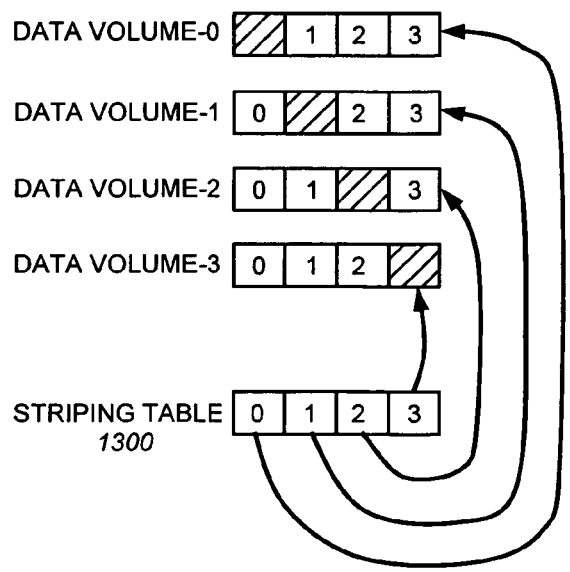
FIG. 13B is a diagram illustrating an exemplary striping table, in accordance with an embodiment of the invention.

Moreover, FIG. 13B is a diagram illustrating an exemplary striping table 1300, in accordance with an embodiment of the invention. The striping table 1300 is an allocation structure that describes the distribution of the chunks of striped data among the volumes. Alternatively described, each location of a chunk of data among the volumes is identified by the striping table 1300. Thus, the striping table 1300 illustrates that striped data is located at a first location on DV-0, at a second location on DV-1, at a third location on DV-2, and a fourth location at DV-3. In the illustrated embodiment, the striped data comprise a file that is striped across multiple volumes of a striped file system. Thus, a geometry, or organization, of the striped file system is illustrated by FIG. 13A.

Advantageously, by striping files across multiple volumes that are distributed among multiple storage systems, volume utilization efficiency can be increased and hot-spotting can be prevented, or mitigated. Further, by implementing restriping processes of exemplary embodiments of the present invention, as further described herein, the restriping processes can limit the amount of data movement among the D-blades 170. Increasing volume utilization efficiency results from distributing data evenly throughout the volumes. Specifically, any one volume should not be visited more frequently during a data access operation than any other volume. Preventing hot-spotting results from preventing the storage of two contiguous stripes of data for the same file. Thus, one volume should not become a bottleneck when accessing particular regions of the file. Further, the restriping processes are implemented when changing the geometry of the striped file system illustrated by FIG. 13A. For example, when adding a volume to or removing a volume from the striped file system, each of the restriping processes rearrange the contents of the allocation structure, which correspondingly moves striped data around the volumes. At least one restriping process is implemented in response to the modification of the clustered computing environment by adding or removing volumes. The restriping processes will be further described in reference to FIGS. 14 through 17.

Figure 14:
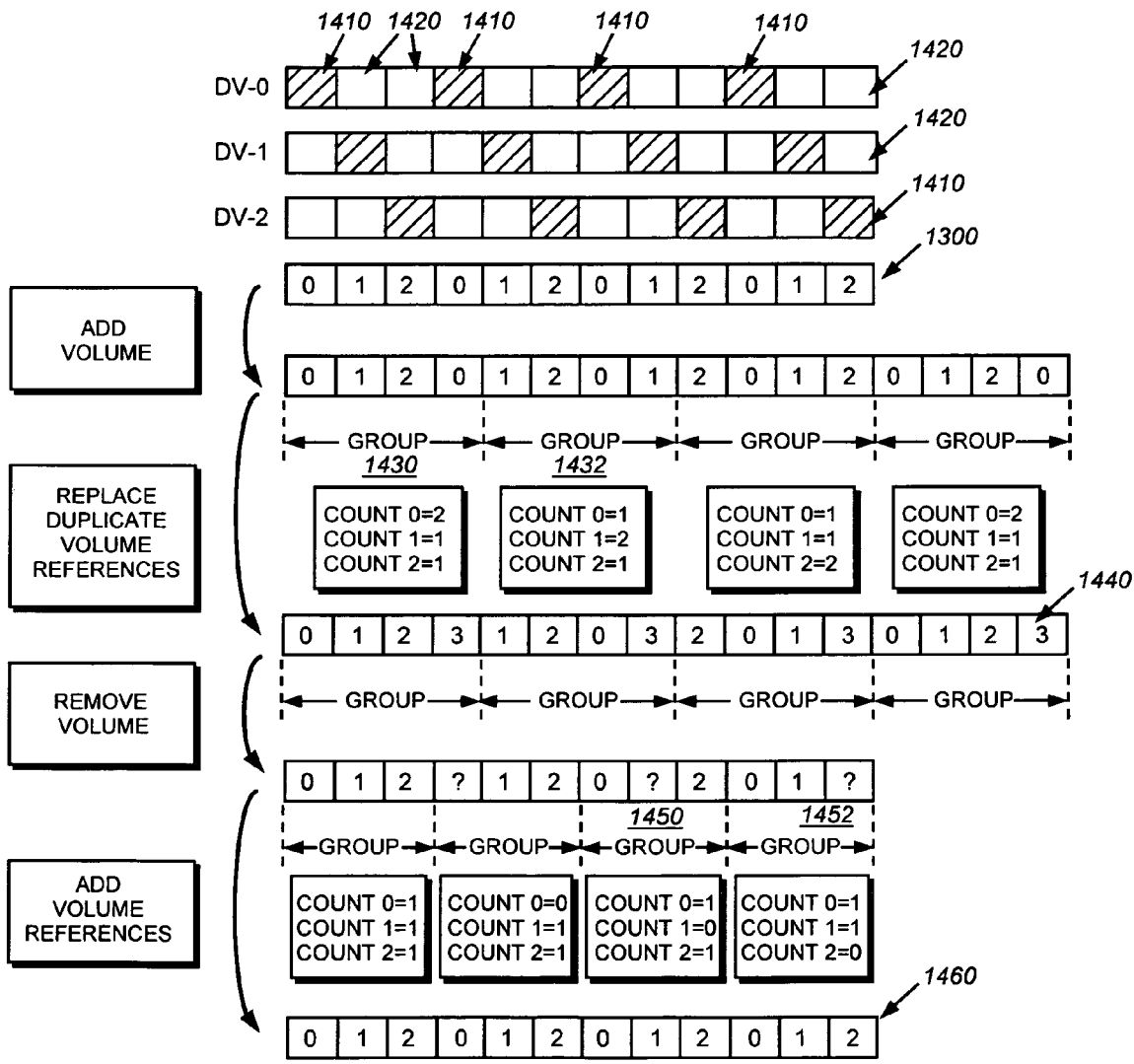
FIG. 14 is a diagram illustrating the addition and removal of volumes of a storage system architecture, in accordance with an embodiment of the invention.

FIG. 14 is a diagram illustrating the addition and removal of volumes of a storage system architecture, in accordance with an embodiment of the invention. Volumes such as DV-0, DV-1, and DV-2 are three volumes distributed in an exemplary embodiment of the storage system architecture. Specifically, one volume is allocated to one storage system. However, other exemplary embodiments allocate at least one volume to each of the multiple storage systems of the storage system architecture. Chunks of data striped with a round robin load balancing technique among the three volumes of FIG. 14 are identified by the striping table 1300. For example, the volume location of striped data 1410 is identified by the contents of the striping table 1300, whereas the sparse locations 1420 of the volume are not identified by the striping table 1300. As previously described, the striping table is an allocation structure of embodiments of the present invention. Although illustrated as a linear structure, the allocation structure can be implemented with any type of structure, such as a three-dimensional structure, or an n-dimensional structure, as long as the n-dimensional structure accurately identifies striped data allocated among volumes of a particular geometry.

Accordingly, the striping table 1300 of FIG. 14 illustrates that the sequence of striped data of a file striped across three volumes is located on DV-0, DV-1, DV-2, DV-0, DV-1, DV-2, DV-0, DV-1, DV-2, DV-0, DV-1, and DV-2. Specifically, exemplary restriping processes are now described when adding and subsequently removing one volume, such as DV-3 (not shown). Specifically, when adding a volume to a cluster, the restriping process is an evolving algorithm. Alternatively, when removing a volume from a cluster, the restriping process is a devolving algorithm. Thus, by implementing at least one restriping process when changing a geometry, data can be distributed optimally while preventing hot-spotting behavior. Further, the restriping process minimizes the amount of time to modify the striping table.

During an exemplary evolving algorithm illustrated by FIG. 14, the length of the striping table 1300 is increased, wherein locations equate to the total number of volumes added. Further, the contents of the striping table 1300 are grouped by the total number of volumes. Within each group, counters are determined, such that the counters identify the number of times an identifier appears in the group. Thus, in group 1430, count( ) equals two because the identifier for DV-0 appears twice. The identifier for DV-1 appears once, resulting in count equal to one, and the identifier for DV-2 appears once, resulting in count2 equal to one. However, in group 1432, the identifier for DV-0 appears once, the identifier for DV-1 appears twice and the identifier for DV-2 appears once. Subsequently, within each group, the counter with the highest value is replaced with an identifier corresponding to the newly added fourth volume, DV-3. Thus, as illustrated by striping table 1440, the duplicate reference within each group is replaced by the new identifier, "3." It should be appreciated that the evolving algorithm is implemented each time a volume is added to the cluster, which correspondingly modifies the striping table 1440.

When removing a volume from the cluster, a restriping process is also implemented for each volume removed from the cluster. Such a restriping process is a devolving algorithm. The striping table is once more grouped, wherein each group is the total number of volumes resulting from the volume removal. Here, the total is three because the striping table 1440 identifies the location of striped data among four volumes. In each group that includes an identifier to the now removed fourth volume, the identifier should be replaced. The replacement identifier is selected from the volume that is least represented within the group. For example, by keeping a count of the number of references to a volume within a group, the counter having the least number of references can be replaced. Specifically, group 1450 includes an identifier for DV-0 and DV-2 but no identifier for DV-1. Thus, the identifier "1" is inserted as a content of the striping table 1460. Correspondingly, group 1452 includes an identifier for DV-0 and DV-1 but no identifier for DV-2. Thus, the identifier "2" is inserted in the striping table 1460.

In other exemplary embodiments of the present invention implementing the evolving and devolving algorithms illustrated in FIG. 14, it should be appreciated that the striping table 1300 need not increase or decrease in size. Particularly, the striping table 1300 can remain a constant size. Such an exemplary striping table size can include 4096 entries. Thus, other striping table sizes are possible that remain constant during the implementation of processes that change the allocation of data among the striped volume set.

Figure 15A:
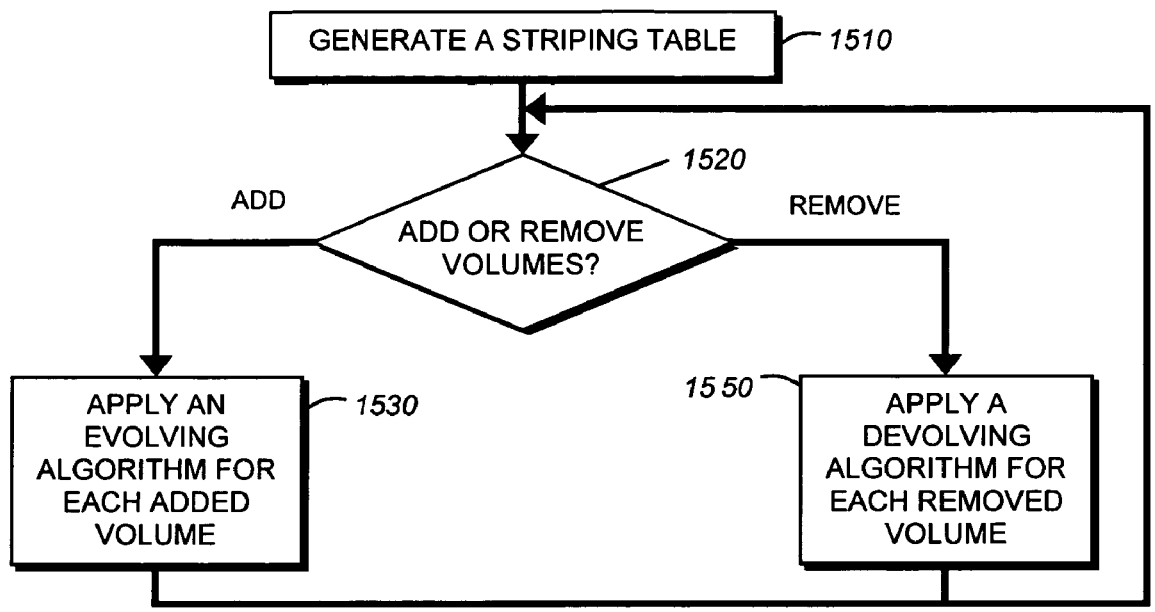
FIG. 15A is a flowchart of operations for the addition and removal of volumes within a storage system architecture, in accordance with an embodiment of the invention.

FIG. 15A is a flowchart of operations for the addition and removal of volumes within a storage system architecture, such as a clustered computing environment, in accordance with an embodiment of the invention. In operation 1510, an administrator, or some other process managed by the storage operating system, can generate a striping table. Specifically, the striping table is an allocation structure that describes the distribution of chunks of data among distributed volumes of the clustered computing environment. When generating the striping table, an exemplary embodiment distributes one volume to one node, such that the connected nodes form a cluster. Specifically, a D-blade of the node provides access to the data stored on the volume. However, it is expressly contemplated by other embodiments of the present invention that multiple volumes may be distributed to a node. The volumes are organized as a striped volume set (SVS), such that the SVS stripes the file as "striped data" across the SVS. Each striped data located on a volume is identified by the striping table. Thus, the striping table describes the location of where chunks of data are stored on the SVS.

Subsequently, in operation 1520, a decision is made whether to add or remove volumes. If multiple volumes are added and/or removed, then the modifications to the SVS results in the implementation of a restriping process. The restriping process rearranges the contents of the striping table, which correspondingly moves the chunks of data within the SVS. A restriping process is said to be an evolving algorithm when adding a volume and a devolving algorithm when removing a volume. For each volume modification, the appropriate restriping process is implemented once. Accordingly, when adding four volumes, four implementations of an evolving algorithm occur. For example, when adding a volume, operation 1530 describes the operations for applying an evolving algorithm for each added volume. Alternatively, when removing a volume, operation 1550 describes the operations for applying a devolving algorithm for each removed volume. After applying a restriping process for each modification to the SVS, both operations 1530 and 1550 return to operation 1520, which determines whether to add or remove volumes.

Figure 15B:
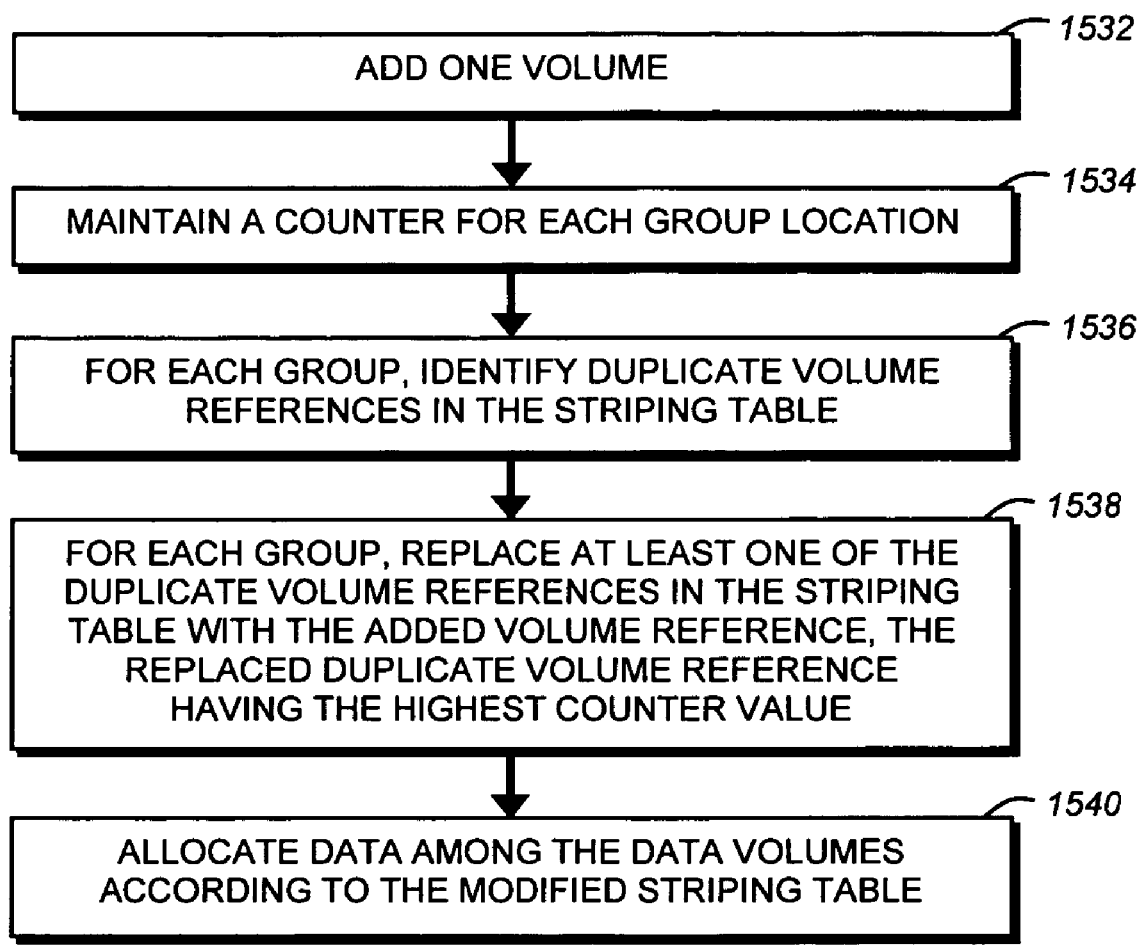
FIG. 15B is a flowchart of operations for the addition of a volume, in accordance with an embodiment of the invention.

FIG. 15B is a flowchart of operations for the addition of a volume, in accordance with an embodiment of the invention. In operation 1532, the addition of one volume increases the amount of volumes available for the storage of striped data in the SVS. The striping table that identifies the locations of the striped data in the SVS is grouped by the total number of volumes, as illustrated in reference to FIG. 14. Next, operation 1534 maintains a counter for each group location. For example, if a group includes four locations, then a counter is generated for each volume of the SVS, with the exception of the added volume. The counters are compared and operation 1536 determines that for each group, the comparison identifies duplicate volume references in the striping table. Accordingly, in operation 1538, for each group, the restriping process of an exemplary embodiment requires the replacement of at least one of the duplicate volume references in the striping table with the added volume reference, such that the replaced duplicate volume reference has the highest counter value. Consequently, in operation 1540, after rearranging the contents of the striping table, the process allocates data among the data volumes according to the modified striping table.

In yet another exemplary embodiment of the present invention, there may be only one replacement of a volume reference within a group. Thus, although multiple volume reference replacements within a group may slightly improve data distribution among the striped volume set, there may be an incurred cost of significantly worsening restriping characteristics. Such a worsening restriping characteristic is the lessening of a round robin distribution of data among the striped volume set.

Figure 15C:
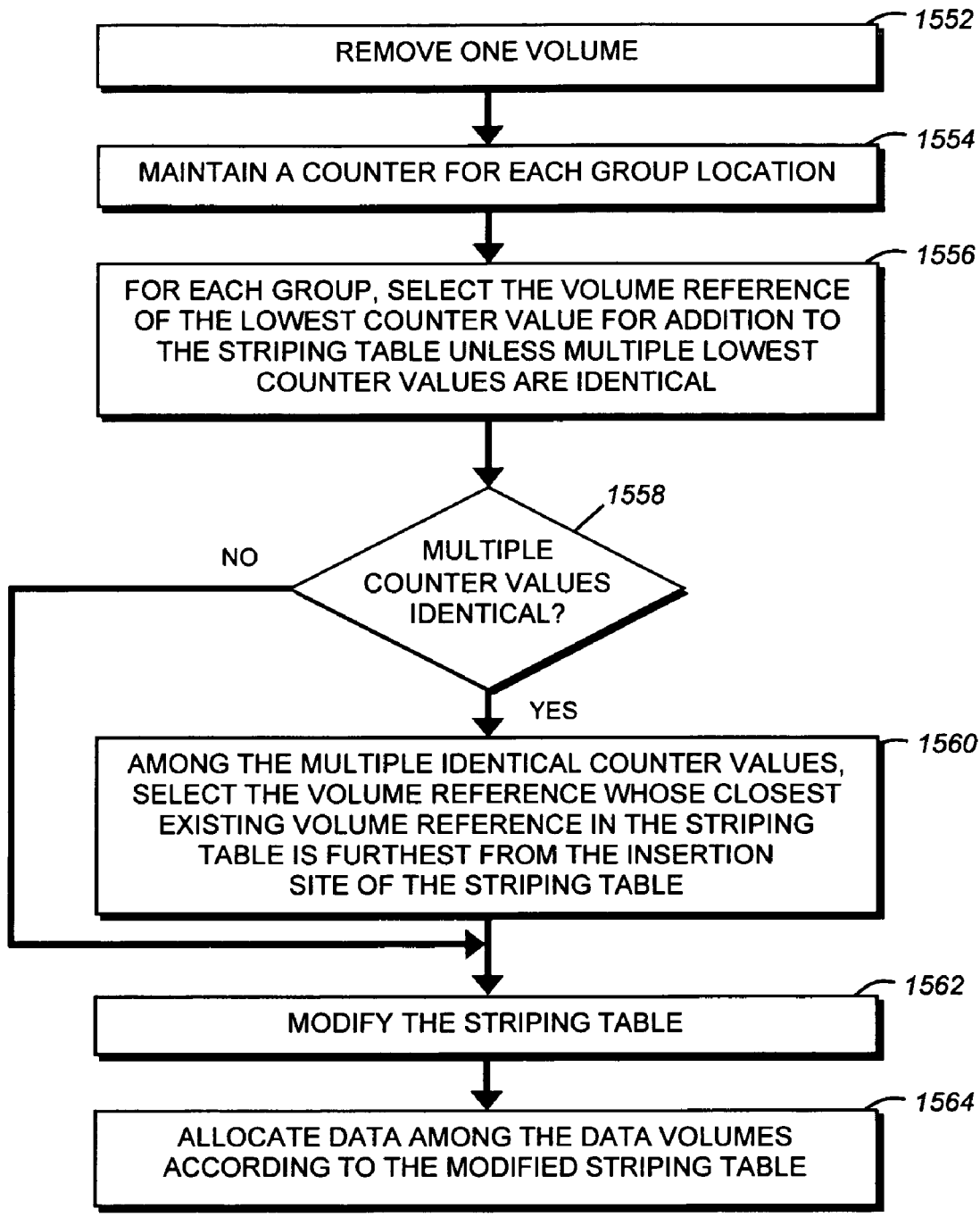
FIG. 15C is a flowchart of operations for the removal of a volume, in accordance with an embodiment of the invention.

FIG. 15C is a flowchart of operations for the removal of a volume, in accordance with an embodiment of the invention. In operation 1552, the removal of one volume decreases the amount of volumes available for the storage of striped data in the SVS. Similar to the exemplary evolving algorithm above, in operation 1554, the process maintains a counter for each group location. Then, in operation 1556, for each group, the process selects the volume reference of the lowest counter value for addition to the striping table, unless multiple lowest counter values are identical. If there are multiple lowest counter values within a group that are identical, then after operation 1558, the process chooses from among the multiple counter values in operation 1560. Specifically, the process selects the volume reference whose closest existing volume reference in the striping table is the furthest from the insertion site of the striping table. The insertion site is the content location that identified the location of striped data on the removed volume. Thus, modification of the striping table occurs in operation 1562 by replacing the removed volume reference in the striping table with a volume reference that is the furthest from the insertion site of the striping table, hot-spotting is prevented, while increasing volume utilization efficiency. Consequently, in operation 1564, after rearranging the contents of the striping table, the process allocates data among the data volumes according to the modified striping table. However, if in operation 1558, multiple counter values are not identical, then the process moves on to operation 1562. In operation 1562, modification of the striping table occurs by replacing the removed volume reference in the striping table with an appropriate volume reference. Such an appropriate volume reference can be an identifier for a volume that is the furthest from the insertion site of the striping table.

The restriping processes described above are implemented by exemplary embodiments of the present invention. However, other restriping process may be implemented instead of, or in conjunction with, the restriping process previously described. For example, another restriping process involves the replacement of every (N+1(th)) reference in the striping table. With reference to FIG. 14, the striping table 1300 is rearranged when adding a volume to the SVS. Thus, for a three volume set, with one added volume, the (3+1(th)) (i.e. fourth) volume reference in the striping table is replaced by the new volume reference. For example, the fourth identifier of "0" is changed to "3," the fourth identifier of "1" is changed to "3," and the fourth identifier of "2" is changed to "3." However, for larger SVS sizes, hot-spotting increases and volume utilization decreases when implementing this restriping process. Thus, improvements to this restriping process are illustrated by other restriping processes described below.

Figure 16A:
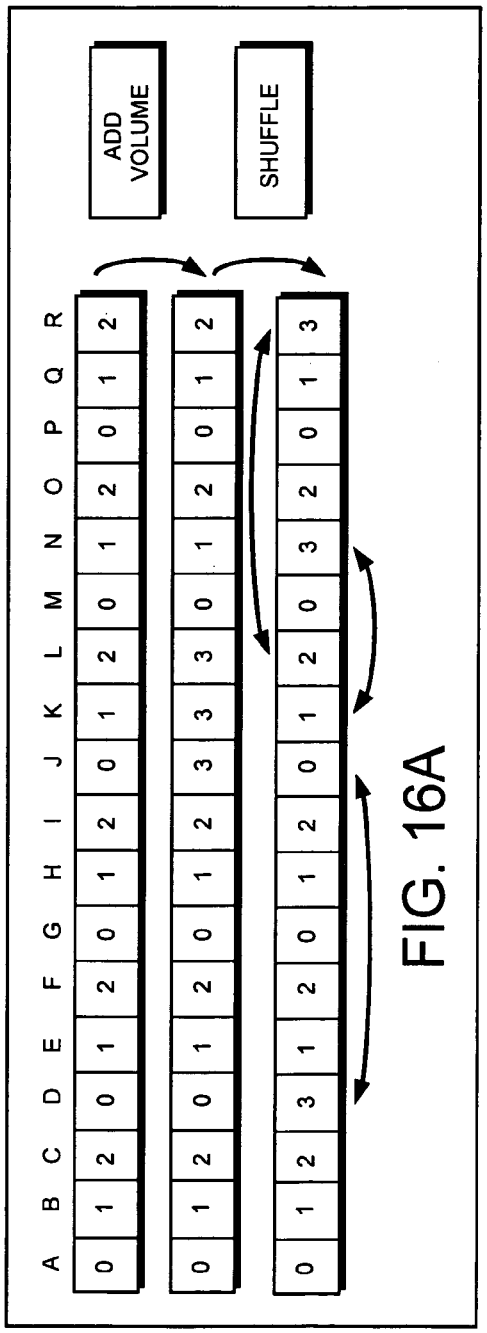
FIG. 16A is a diagram illustrating a restriping process, in accordance with an embodiment of the invention.

For example, FIGS. 16A through 16G illustrate other restriping processes that may be implemented by other exemplary embodiments of the present invention. Specifically, FIG. 16A is a diagram illustrating another restriping process, in accordance with an embodiment of the invention. The illustrated striping table can be labeled for clarity with "A" through "L." Further, the contents of the striping table illustrate a round robin distribution of the striped data among the SVS. Thus, A through C, D though F, G through I, etc. illustrate that volumes 0, 1, and 2 are identified as containing striped data. Following the (N+1(th)) restriping process above, the fourth identifier is replaced with the new volume identifier of "3." However, to improve the distribution of volume usage, a permutation operation (e.g. a "shuffle" operation similar to shuffling a deck of playing cards) is added to further reorder the location of striped data. The permutation can be a fixed permutation deterministically generated by pseudorandom techniques, as described below. If the assignment of stripes to volumes is recorded in table form, then the permutation could reorder the entries of the table in a pseudorandom but deterministic fashion. The result will have exactly the same overall distribution of the data among the volumes, but may achieve a better localized distribution and balance.

Specifically, a shuffle operation may include a permutation of identifiers of the striping table of FIG. 16A by moving an identifier at a first location I to a second location (2*I) for I<(n/2), where n is the total number of locations of the striping table. Further, an identifier may be moved from a first location I to a second location ((2*I modulo n)+1) for ((n/2)≦I<n). In addition, similar to "cutting" a deck of playing cards, the shuffle operation includes a rotation of the identifiers of the striping table to different locations by a pseudo-random number p, so that the identifier at location I moves to location ((I+p) modulo n). By selecting p pseudo-randomly, with a known seed value, permutations of the locations of the striping table can occur deterministically by repeated "cuts" and "shuffles." It should be appreciated that seed values used in pseudo-random operations are known to those of ordinary skill in the art. After some number of iterations of "cuts" and "shuffles," such as an exemplary six iterations for the striping table illustrated on FIG. 16A, good pseudo-randomization of the identifiers of the striping table can occur. However, any suitable number of iterations is possible, such as the number of iterations for "cutting and shuffling" a deck of playing cards to one's satisfaction.

In other exemplary embodiments, a predetermined permutation stored as a linear array in memory (e.g. computed in advance of establishing the SVS) can be applied to the striping table. Thus, a striping table can be developed using the "shuffle" operation described above and subsequently applying the predetermined permutation. Further, multiple predetermined permutations can be stored, whether determined randomly or pseudo-randomly generated, for application to the striping table.

Figure 16B:
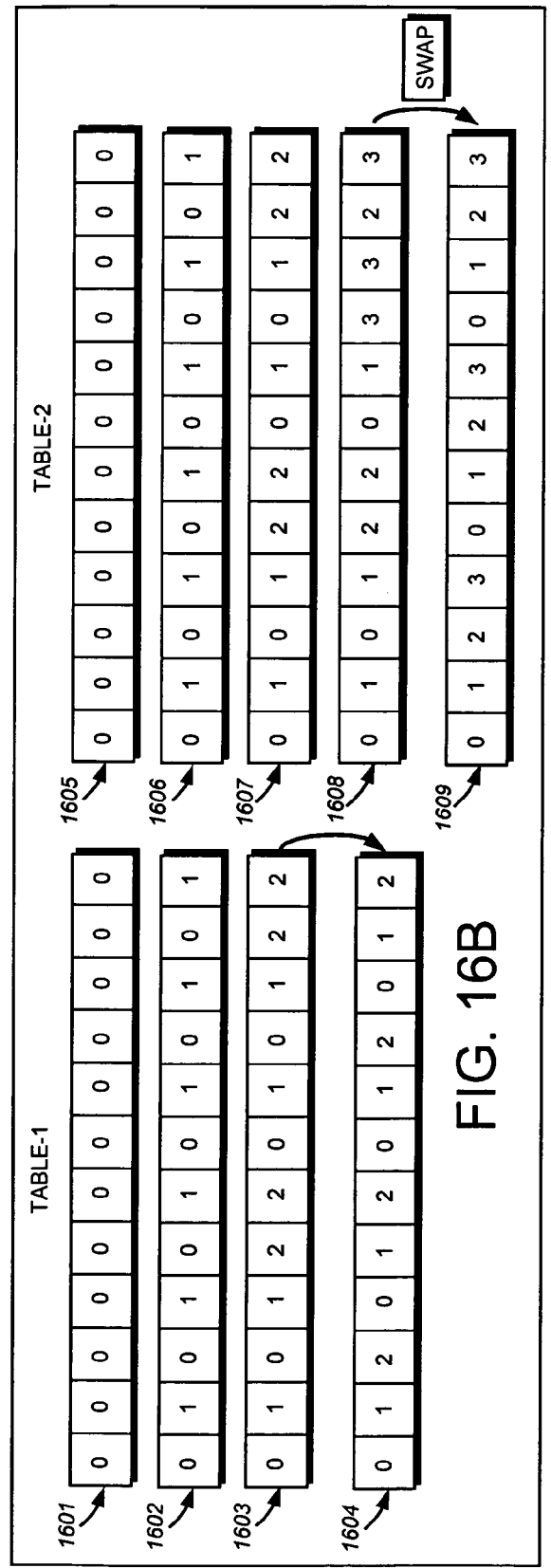
FIG. 16B is a diagram illustrating a restriping process, in accordance with an embodiment of the invention.

The next restriping process, as illustrated by FIG. 16B, does not involve shuffling. Specifically, the process applies a permutation to sort one striping table of an SVS with having an exemplary size into round robin order, while applying exactly the same permutation to another striping table for a different size SVS. For example, any two tables are generated by any of the processes herein described. Preferably, the process results in a striping table that describes an SVS with a round robin layout, since round robin layouts have many good properties, such as an even distribution of data in the SVS. However, when modifying the SVS, the goal is to only move (I/(V+1)) of the stripes of an SVS with V number of volumes. It should be appreciated that although the processes described herein are applied to obtain round robin layouts, other suitable layouts are possible that have good properties. Such good properties are those that were previously described regarding hot-spotting, etc.

In yet another embodiment, FIG. 16B is a diagram illustrating another restriping process, in accordance with an embodiment of the invention. In this exemplary embodiment, two striping tables, table-1 and table-2 are utilized, wherein table-1 represents the current number of volumes in the SVS and table-2 represents the SVS with the additional volume. Table-1 illustrates "growing" the striping table one volume at a time to three volumes. Initially, the striping table is populated by identifiers to volume 0 on striping table 1601. After adding one volume, striping table 1602 illustrates a round robin of two volumes having identifiers of 0 and 1. Specifically, by replacing the (N+1(th)) volume reference, round robin load balancing occurs. Upon the addition of a third volume and the insertion of the identifier "2" to table-1, striping table 1603 results.

Correspondingly, table-2 is "grown" from an initial SVS having one volume on striping table 1605. With each additional volume, the (N+1(th)) occurrence of each unique identifier is replaced in table-2. Thus, striping table 1606 illustrates identifiers for volumes 0 and 1, striping table 1607 illustrates identifiers for volumes 0, 1, and 2, and striping table 1608 illustrates identifiers for volumes 0, 1, 2, and 3. Consequently, the contents of striping table 1604 are rearranged during a swap operation, along with the contents of striping table 1609. The rearrangement of table-1 to illustrate identifiers for round robin striped data is thus mimicked on table-2 to also obtain round robin striped data. However, this restriping process, while an improvement over the restriping process of FIG. 16A, may experience volume utilization efficiency degradation for larger volume sets.

In another embodiment of FIG. 16B, the process using two tables includes generating the two tables for the two values of V (e.g. Table-1) and V+1 (e.g. Table-2) using any process described herein. Then, when adding volume d, the process involves moving every (1/d) remaining stripes. A permutation of Table-1 results in a striping table that describes a round robin layout. One method of permutation is the reordering of the striping table by selecting the next unmoved entry with value (I modulo v) when filling location L During the performance of a set of moves on Table-1 for the number of volumes V to coerce it to be round robin, simultaneous moves on Table-2 are performed for the number of volumes V+1. The result of this permutation will be a layout table which has the desired properties of being "close" to the table for V. The desired properties result because most of the entries in the two tables were the same initially, and simultaneous or near-simultaneous permutations occurred for all the entries in the two tables in exactly the same way. Further, by using the above technique, a striping table for an SVS of size V+1 would require the movement of 1/(V+1) of the data. Thus, for any striping table representing a layout of identifiers in some number of V volumes, the striping table can be reordered (permuted) in one or more ways to produce a round robin layout of identifiers among the volumes.

Figure 16C:
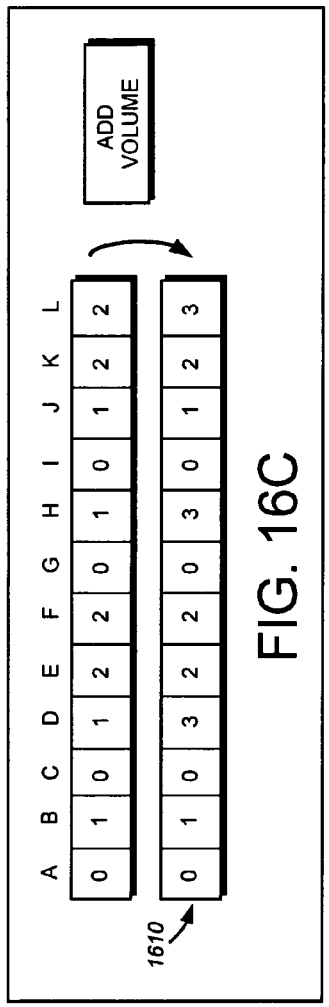
FIG. 16C is a diagram illustrating a restriping process, in accordance with an embodiment of the invention.

Another restriping process is illustrated by FIG. 16C, in accordance with an embodiment of the invention. This restriping process is similar to the replacement of (N+1) volume references as described above with respect to FIG. 14, but instead of replacing the (N+1(th)) volume reference, the (N+1(th)) identifier on the striping table is replaced, regardless of the contents. For example, after adding a fourth volume to the three-volume SVS referenced by striping table 1610, the fourth identifier is replaced with a "3" regardless of the volume reference already identified in the three-volume SVS. Regarding this restriping process, although identifiers are now scattered throughout the striping table, which increases the distribution of volume references, overall volume utilization efficiency may not be optimal.

Figure 16D:
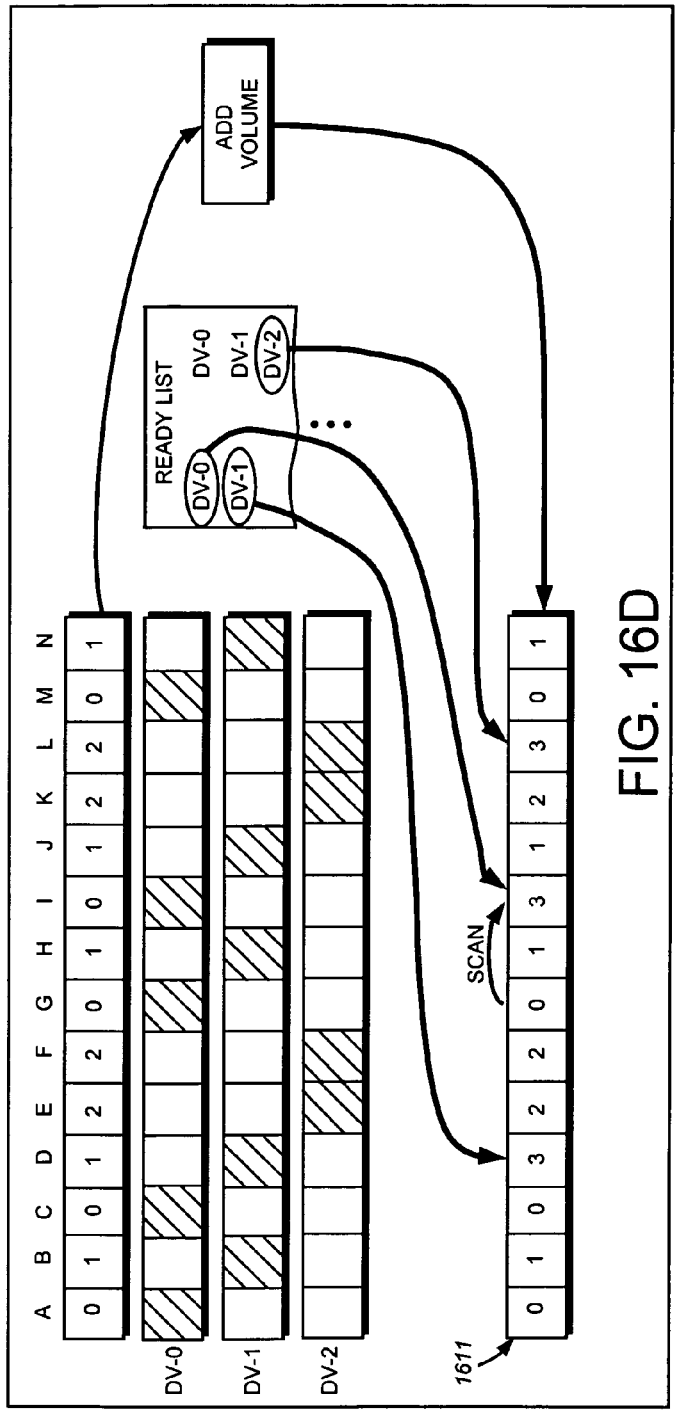
FIG. 16D is a diagram illustrating a restriping process, in accordance with an embodiment of the invention.

FIG. 16D is a diagram illustrating another restriping process, in accordance with an embodiment of the invention. Specifically, when adding a volume to a three-volume SVS, as illustrated by DV-0, DV-1 and DV-2, the resulting striping table 1611 results from the use of a ready list. The ready list contains volume references that can be replaced on the striping table. Initially, the ready list is populated with every volume reference. When adding a fourth volume, the fourth location is replaced in the striping table. The replaced volume reference is subsequently removed from the ready list. For example, the volume reference to DV-1 is removed from the ready list and the identifier in the striping table at content location "C" refers to volume "3" (i.e. DV-3, the added fourth volume). Then, content location "H" is examined for replacement. However, because DV-1 has been removed from the ready list. The process scans forward and backward on the striping table from the replacement content location, looking for the first content location that corresponds to a volume on the ready list. The first content location resulting from the scan identifies DV-0 on the ready list. Accordingly, content location "I" is replaced by the volume identifier "3," and DV-0 is removed from the ready list. It should be appreciated that the decision to scan forward and then backward is arbitrary and the process can also begin the scan in the other direction. When the ready list is depleted, all the volume references repopulate the ready list. This process permits high volume utilization and supplies a degree of randomness, thus providing a high distribution efficiency.

Figure 16E:
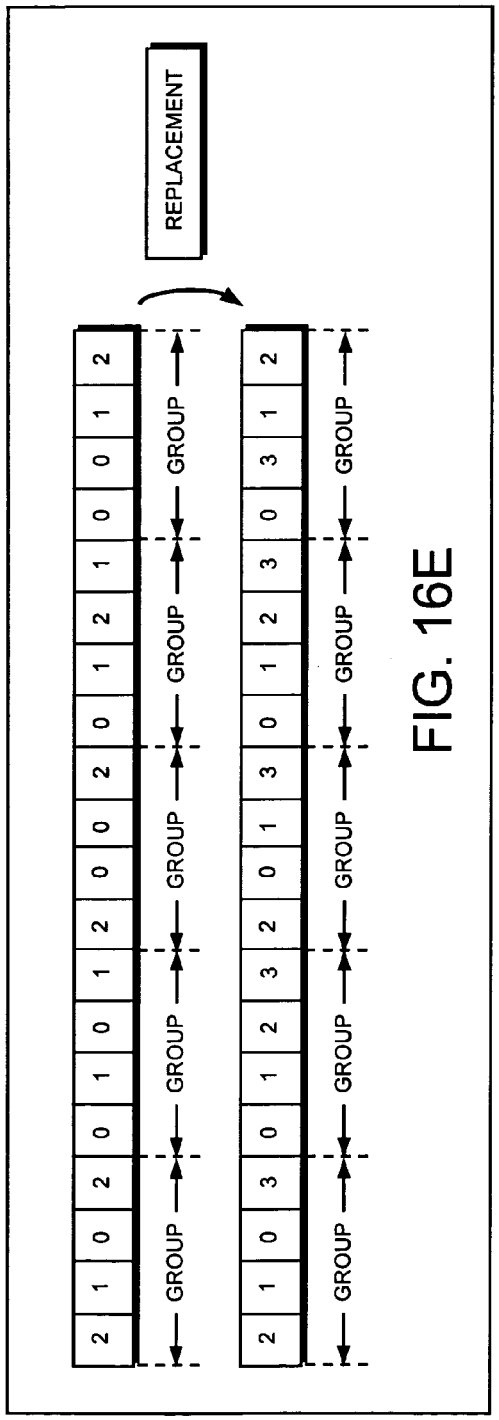
FIG. 16E is a diagram illustrating a restriping process, in accordance with an embodiment of the invention.

FIG. 16E is a diagram illustrating a restriping process, in accordance with an embodiment of the invention. When implementing restriping process in an exemplary embodiment, the striping table is once more grouped by the total number volumes of the SVS, similar to the illustration of FIG. 14. However, after generating (N+1) groups, such that N was the number of volumes of the SVS before the addition of a volume, duplicate volume references are replaced, without the use of counters. Although this process produces high volume utilization efficiency, this process may have poor round robin load balancing results.

Figure 16F:
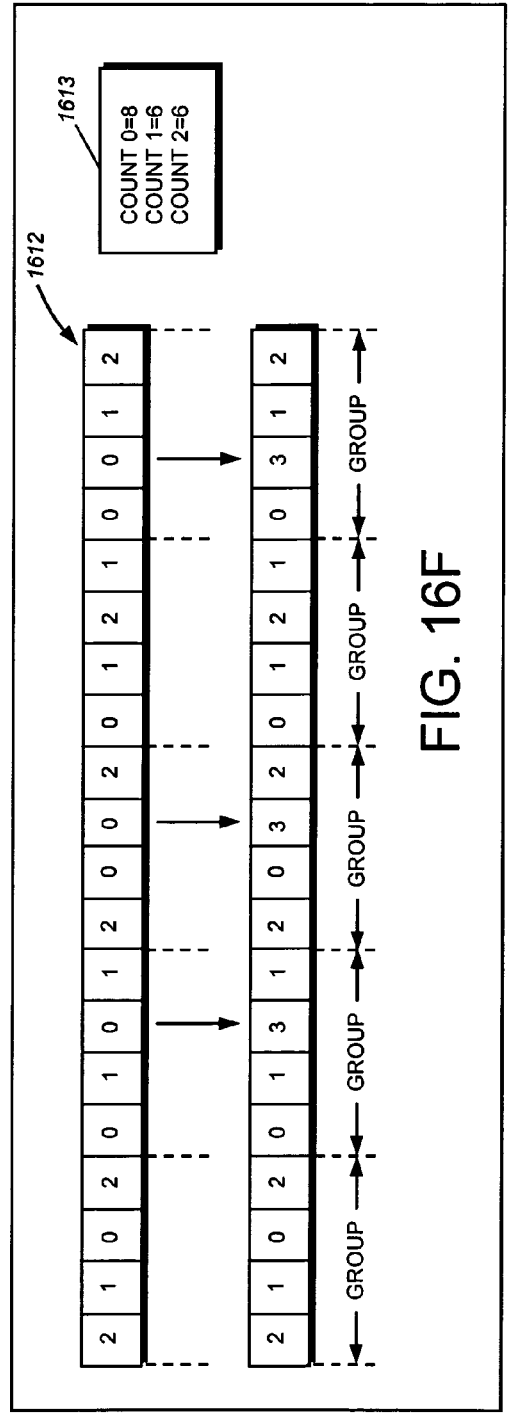
FIG. 16F is a diagram illustrating a restriping process, in accordance with an embodiment of the invention.

Accordingly, FIG. 16F is a diagram illustrating another restriping process, in accordance with an embodiment of the invention. For example, after generating (N+1) groups, counters are recorded on a counter list 1613 that count the total number of volume references that exist in striping table 1612. Specifically, volume 0 is referenced eight times while volumes 1 and 2 are referenced six times each on the striping table 1612. By examining the counter list 1613, the process can replace the volume reference having the highest counter. Thus, volume 0 is replaced three times, until the counter is decreased to five volume references, which is less than the other counters on the counter list 1613. While volume utilization efficiency is slightly reduced from the process illustrated by FIG. 16E, multiple replacements in the same group increase hot-spotting behavior. Further, the process may suffer from sub-optimal restriping behavior because of multiple replacements that can occur for each group.

Figure 16G:
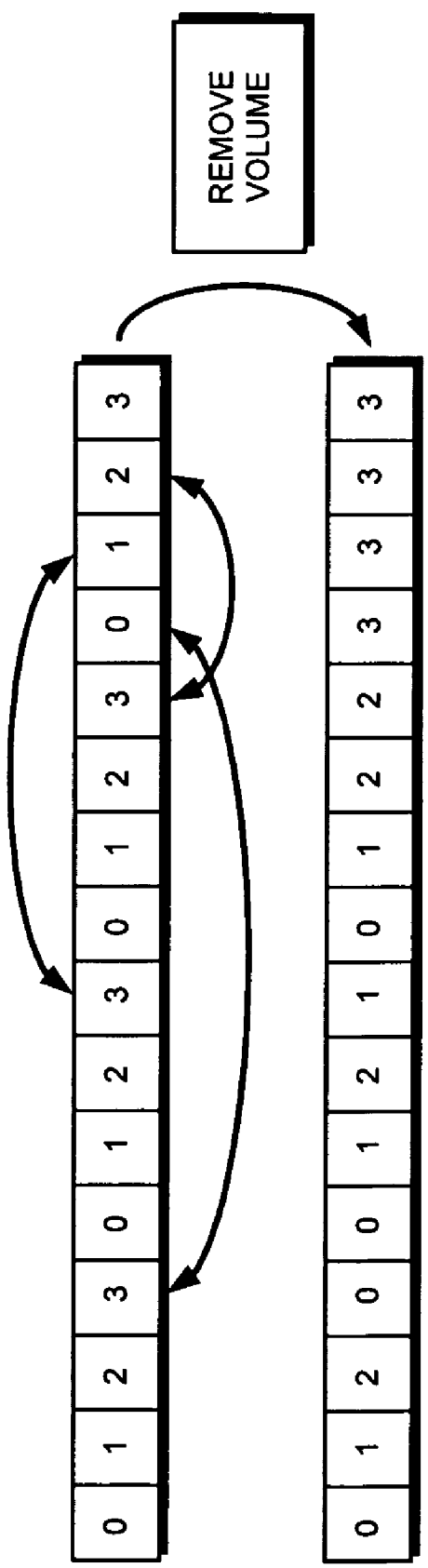
FIG. 16G is a diagram illustrating a restriping process, in accordance with an embodiment of the invention.

FIG. 16G is a diagram illustrating a restriping process, in accordance with an embodiment of the invention. In this exemplary restriping process illustrating a devolving algorithm, one volume is removed from a four-volume SVS. In this process, the volume references to volume "3" are no longer valid. Thus, the process moves the volume references to the end of the striping table. The replacements for the identifier to volume "3" are selected in a round robin fashion from the existing valid volume references. Here, the valid volume reference are "0," "1," and "2."

Figure 17:
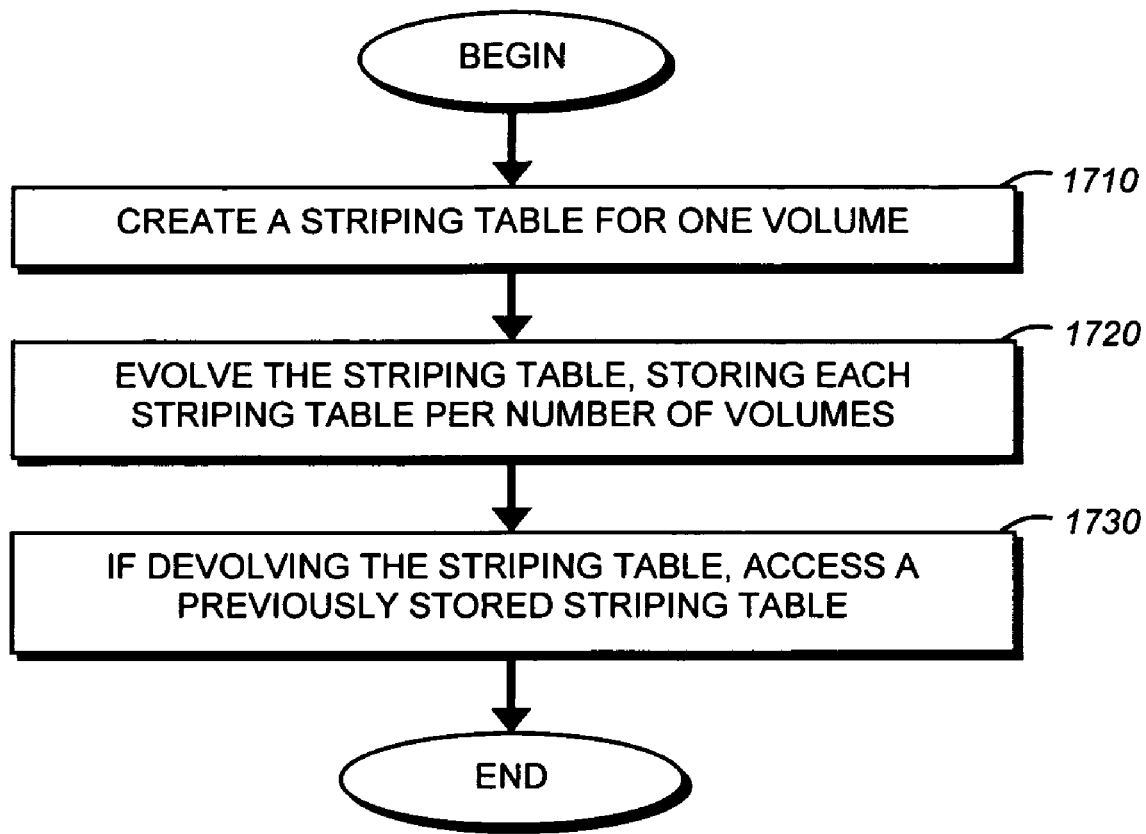
FIG. 17 is a flowchart of operations for evolving a striping table, in accordance with an embodiment of the invention.

Although the various restriping processes described above can be classified as evolving and devolving algorithms, other embodiments of the present invention can implement evolving algorithms without ever implementing devolving algorithms. For example, FIG. 17 is a flowchart of operations for evolving a striping table, in accordance with an embodiment of the invention. The operations begin in operation 1710 by creating a striping table for one volume. As the SVS "grows" by adding one volume at a time to the SVS, operation 1720 evolves the striping table, and store each striping table per number of volumes. For example, a record is stored of the configuration of a striping table of one volume, of two volumes, of three volumes, etc. If a volume is removed from the SVS, then the records can be examined. Specifically in operation 1730, if devolving the striping table, then the "evolution" of the striping table requires access to a previously stored striping table.

Alternatively, in other exemplary embodiments of the present invention (not shown), operations for devolving a striping table can be implemented without the implementation of an evolving algorithm. For example, a striping table can be implemented with round robin for some arbitrary striped volume set having a maximum amount of volumes. Such a maximum amount of volumes can be 255 volumes. Thus, when "shrinking" (e.g. if starting from 255 volumes) the SVS when removing volumes, the various configurations of striping tables resulting from implementing devolving algorithms can be stored for future use, similar to the use of recorded striping table configurations of FIG. 17. Specifically, if evolving the striping table, then the "devolution" of the striping table requires access to previously stored striping tables. It should be appreciated that any suitable number of volumes for a maximum-sized SVS is possible, as long as only devolving algorithms are implemented to achieve striping table configurations.

The foregoing description has been directed to particular embodiments of this invention. It will be apparent, however, that other variations and modifications may be made to the described embodiments, with the attainment of some or all of their advantages. Specifically, it should be noted that the principles of the present invention may be implemented on non-distributed file systems. Furthermore, while this description has been written in terms of N and D-blades, the teachings of the present invention are equally suitable to systems where the functionality of the N and D-blades are implemented in a single system. The single system relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations. Alternately, the functions of the N and D-blades may be distributed among any number of separate systems, wherein each system performs one or more of the functions.

Embodiments of the present invention can be managed by a computing environment management system. For example, a computing environment management system, such as Data Fabric Manager (DFM), and the like, developed by Network Appliance Inc., of Sunnyvale, Calif., can manage the clustered computing environment. With the above embodiments in mind, it should be understood that the invention can employ various computer-implemented operations involving data stored in computer systems. These operations are those requiring physical manipulation of physical quantities. Usually, though not necessarily, these quantities take the form of electrical, magnetic, optical signals, or the like, that are capable of being stored, transferred, combined, compared and otherwise manipulated. Any of the operations described herein that form part of the invention are useful machine operations. Additionally, the procedures, processes and/or modules described herein may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A method of data allocation, comprising:

identifying a storage system architecture for allocating data among a plurality of original volumes distributed across a plurality of storage systems;

identifying an allocation structure, wherein the allocation structure describes the distribution of chunks of data among the original volumes using identifiers referencing the original volumes;

modifying the storage system architecture in response to adding or removing a volume to the storage system architecture by moving chunks of data from the original volumes to an added volume, or moving chunks of data from a removed volume to one or more original volumes; and updating the allocation structure in response to the modified storage system architecture by one of (i) organizing the identifiers of the allocation structure into groups, and (ii) reordering the identifiers of the allocation structure using a permutation operation.

2. The method of claim 1, wherein organizing the identifiers of the allocation structure into groups comprises:

replacing at least one identifier having a highest number of references within each group with a new identifier corresponding to the added volume, or replacing an identifier corresponding to the removed volume with an identifier having a least number of references within each group.

3. The method of claim 2, further comprising identifying a number of times an identifier appears in each group using counters.

4. The method of claim 3, wherein the allocation structure is a striping table.

5. The method of claim 1, wherein the permutation operation is a shuffle operation and wherein reordering the identifiers of the allocation structure using the shuffle operation comprises moving an identifier at a first location I to a second location (2*I) for I<(n/2), wherein n is a total number of locations of the allocation structure.

6. The method of claim 1, wherein the permutation operation is a shuffle operation and wherein reordering the identifiers of the allocation structure using the shuffle operation comprises moving an identifier from a first location I to a second location ((2*I modulo n)+1) for ((n/2)<I<n, wherein n is a total number of locations of the allocation structure.

7. The method of claim 1, wherein the permutation operation is a shuffle operation and wherein reordering the identifiers of the allocation structure using the shuffle operation comprises a rotation of the identifiers of the allocation structure to different locations by a pseudo-random number p, so that the identifier at location I moves to location ((I+p) modulo n), wherein n is a total number of locations of the allocation structure.

8. The method of claim 1, wherein reordering the identifiers of the allocation structure using the permutation operation comprises sorting the identifiers of the allocation structure into round robin order.

9. The method of claim 1, wherein updating the allocation structure further comprises:

implementing at least one restriping process executing on at least one storage system in response to modifying the storage system architecture.

10. A system for data allocation within a storage system architecture, comprising:

a processor of a storage system;

a memory coupled to the processor, the memory comprising storage locations addressable by the processor for storing and manipulating an allocation structure identifying a plurality of original volumes of the storage system, the allocation structure further describing distribution of chunks of data among the original volumes using identifiers referencing the original volumes; and a storage operating system resident in the memory and executed by the processor, the storage operating system implementing a plurality of restriping processes, wherein each of the plurality of restriping processes updates the allocation structure in response to modification of the storage system architecture by adding or removing a volume to the storage system architecture, each restriping process rearranging contents of the allocation structure by one of (i) organizing the identifiers of the allocation structure into groups, and (ii) reordering the identifiers of the allocation structure using a permutation operation.

11. The system of claim 10, wherein the restriping process organizes the identifiers of the allocation structure into groups by:

replacing at least one identifier having a highest number of references within each group with a new identifier corresponding to the added volume, or replacing an identifier corresponding to the removed volume with an identifier having a least number of references within each group.

12. The system of claim 11, further comprising a plurality of counters stored in the memory and manipulated by the process, each counter configured to identify a number of times an identifier appears in each group.

13. The system of claim 12, wherein the allocation structure is a striping table.

14. The system of claim 10, wherein the permutation operation is a shuffle operation and wherein the restriping process reorders the identifiers of the allocation structure using the shuffle operation by moving an identifier at a first location I to a second location (2*I) for I<(n/2), wherein n is a total number of locations of the allocation structure.

15. The system of claim 10, wherein the permutation operation is a shuffle operation and wherein the restriping process reorders the identifiers of the allocation structure using the shuffle operation by moving an identifier from a first location I to a second location ((2*I modulo n)+1) for ((n/2)<I<n, wherein n is a total number of locations of the allocation structure.

16. The system of claim 10 wherein the permutation operation is a shuffle operation and wherein the restriping process reorders the identifiers of the allocation structure using the shuffle operation by rotating the identifiers of the allocation structure to different locations by a pseudo-random number p, so that the identifier at location I moves to location ((I+p) modulo n), wherein n is a total number of locations of the allocation structure.

17. The system of claim 10 wherein the restriping process reorders the identifiers of the allocation structure using the permutation operation by sorting the identifiers of the allocation structure into round robin order.

18. A computer readable medium including instructions for data allocation within a storage system architecture, comprising:

instructions for identifying the storage system architecture for allocating data as stripes among a plurality of original volumes distributed across a plurality of storage systems of the storage system architecture;

instructions for identifying an allocation structure, wherein the allocation structure describes the distribution of chunks of data among the original volumes using identifiers referencing the original volumes;

instructions for modifying the storage system architecture in response to adding or removing a volume to the storage system architecture by moving chunks of data from the original volumes to an added volume, or moving chunks of data from a removed volume to one or more original volumes; and instructions for updating the allocation structure in response to the modified storage system architecture by one of (i) organizing the identifiers of the allocation structure into groups, and (ii) reordering the identifiers of the allocation structure using a permutation operation.

19. The computer readable medium of claim 18, wherein organizing the identifiers of the allocation structure into groups further comprises:

instructions for replacing at least one identifier having a highest number of references within each group with a new identifier corresponding to the added volume, or instructions for replacing an identifier corresponding to the removed volume with an identifier having a least number of references within each group.

20. The computer readable medium of claim 19, further comprising instructions for identifying a number of times an identifier appears in each group using counters.

21. The computer readable medium of claim 20, wherein the allocation structure is a striping table.

22. The computer readable medium of claim 18, wherein the permutation operation is a shuffle operation and wherein reordering the identifiers of the allocation structure using the shuffle operation comprises moving an identifier at a first location I to a second location (2*I) for I<(n/2), wherein n is a total number of locations of the allocation structure.

23. The computer readable medium of claim 18, wherein the permutation operation is a shuffle operation and wherein reordering the identifiers of the allocation structure using the shuffle operation comprises moving an identifier from a first location I to a second location ((2*I modulo n)+1) for ((n/2)<I<n wherein n is a total number of locations of the allocation structure.

24. The computer readable medium of claim 18, wherein the permutation operation is a shuffle operation and wherein reordering the identifiers of the allocation structure using the shuffle operation comprises a rotation of the identifiers of the allocation structure to different locations by a pseudo-random number p, so that the identifier at location I moves to location ((I+p) modulo n), wherein n is a total number of locations of the allocation structure.

25. The computer readable medium of claim 18, wherein reordering the identifiers of the allocation structure using the permutation operation comprises sorting the identifiers of the allocation structure into round robin order.

26. The computer readable medium of claim 18, wherein updating the allocation structure further comprises:

implementing at least one restriping process executing on at least one storage system in response to modifying the storage system architecture.

* * * * *